(12) United States Patent
Pang et al.

(10) Patent No.: US 10,505,833 B2
(45) Date of Patent: Dec. 10, 2019

(54) PREDICTING VIDEO ENGAGEMENT FROM WIRELESS NETWORK MEASUREMENTS

(71) Applicant: AT&T Intellectual Property I, L.P., Atlanta, GA (US)

(72) Inventors: Jeffrey Pang, Berkeley, CA (US); Jeffrey Erman, Morristown, NJ (US); Lusheng Ji, Randolph, NJ (US); Jia Wang, Randolph, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 583 days.

(21) Appl. No.: 14/278,818

(22) Filed: May 15, 2014

(65) Prior Publication Data

US 2015/0333986 A1  Nov. 19, 2015

(51) Int. Cl.
*H04L 12/26* (2006.01)
*H04L 12/24* (2006.01)

(52) U.S. Cl.
CPC ...... *H04L 43/0888* (2013.01); *H04L 41/5067* (2013.01)

(58) Field of Classification Search
None
See application file for complete search history.

(56) References Cited

U.S. PATENT DOCUMENTS

| | | | |
|---|---|---|---|
| 9,390,402 B1* | 7/2016 | Kane, Jr. | G06Q 10/101 |
| 2002/0039371 A1* | 4/2002 | Hedayat | H04L 12/2697 |
| | | | 370/516 |
| 2011/0282745 A1* | 11/2011 | Meoded | G06Q 30/0264 |
| | | | 705/14.61 |
| 2013/0111052 A1 | 5/2013 | Albal et al. | |
| 2013/0174045 A1* | 7/2013 | Sarukkai | H04N 21/23439 |
| | | | 715/744 |
| 2013/0294263 A1* | 11/2013 | Haga | H04W 24/08 |
| | | | 370/252 |
| 2013/0324075 A1 | 12/2013 | Andrianov et al. | |
| 2014/0254360 A1* | 9/2014 | Lee | H04W 28/0268 |
| | | | 370/230 |
| 2014/0278308 A1* | 9/2014 | Liu | H04L 67/22 |
| | | | 703/6 |
| 2014/0289241 A1* | 9/2014 | Anderson | G06F 17/30038 |
| | | | 707/736 |
| 2015/0066583 A1* | 3/2015 | Liu | G06Q 30/0201 |
| | | | 705/7.29 |

(Continued)

OTHER PUBLICATIONS

G. Dimopoulos, et al., "Analysis of YouTube Use Experience from Passive Measurements," IEEE Oct. 14-18, 2013; pp. 260-267.

(Continued)

*Primary Examiner* — Adnan Baig
(74) *Attorney, Agent, or Firm* — Cantor Colburn LLP

(57) ABSTRACT

A mechanism is provided for predicting video engagement from network measurements for a user device connected to a wireless network. Wireless network measurements are retrieved from a wireless network device in the wireless network. The wireless network measurements are related to the user device of a user. It is determined that the user device is engaged in a video streaming session. A computer classifies the video streaming session as one of a plurality of classes, in which the plurality of classes predict an outcome of the video streaming session for the user device.

15 Claims, 14 Drawing Sheets

(56) References Cited

U.S. PATENT DOCUMENTS

2015/0112796 A1* 4/2015 Greenzeiger ...... G06Q 30/0251
 705/14.49

OTHER PUBLICATIONS

J. Erman, et al., "Over the Top Video: the Gorilla in Cellular Networks," IMC'11, Nov. 2-4, 2011, Berlin, Germany; Copyright 2011; pp. 1-7.
R. Sitaraman, "Network Performance: Does It Really Matter to Users and By How Much?," 2013 IEEE; pp. 1-10.

* cited by examiner

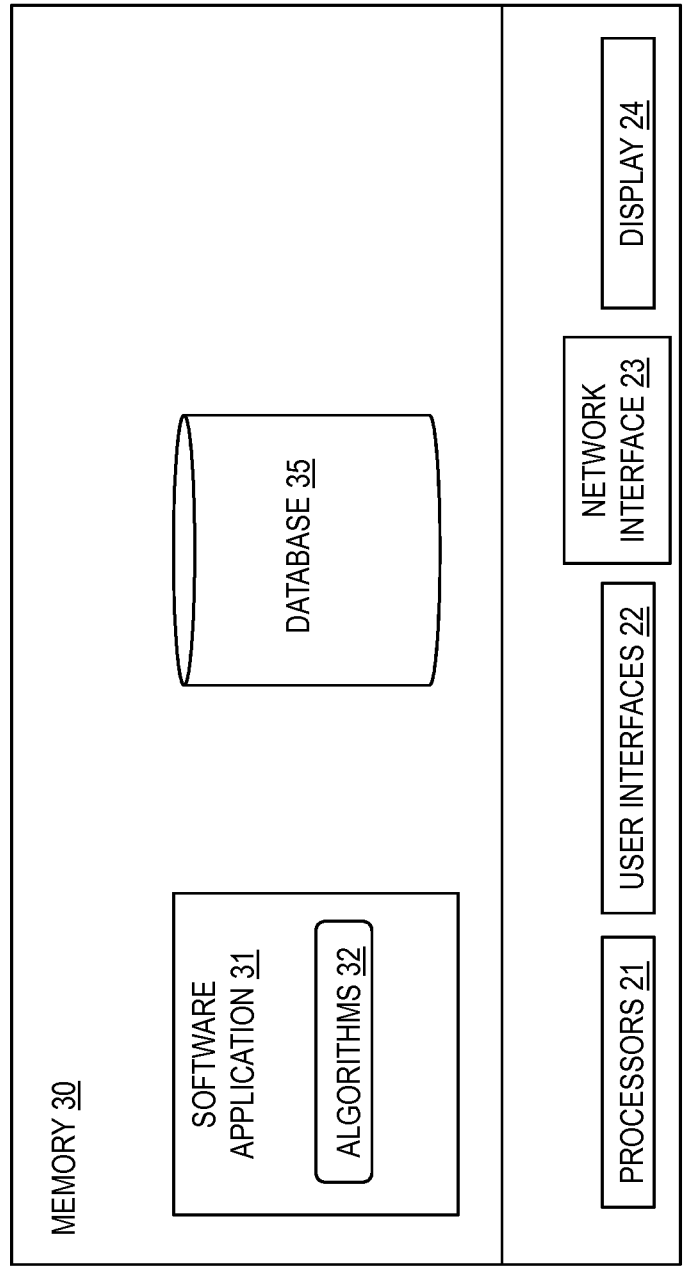

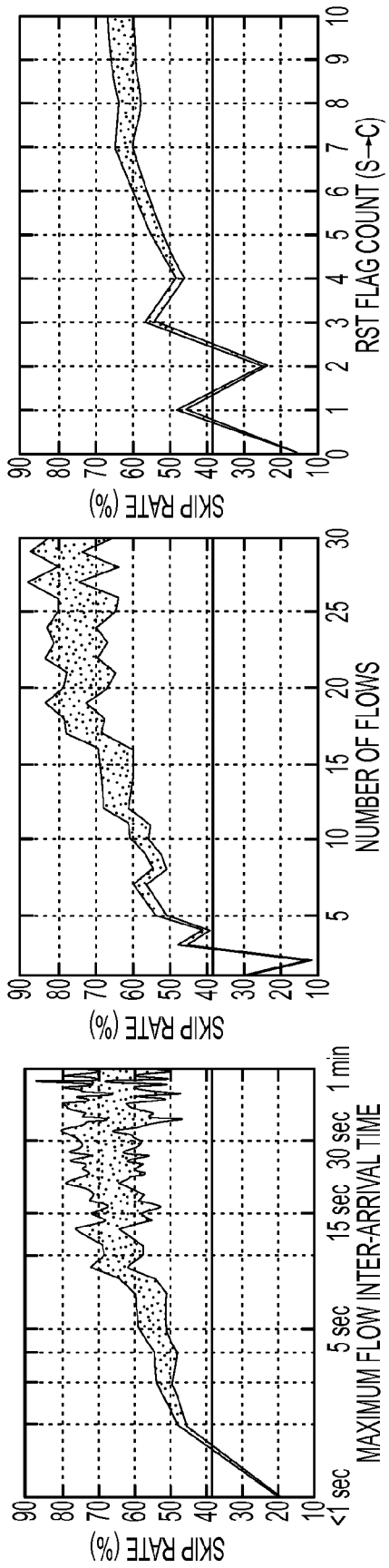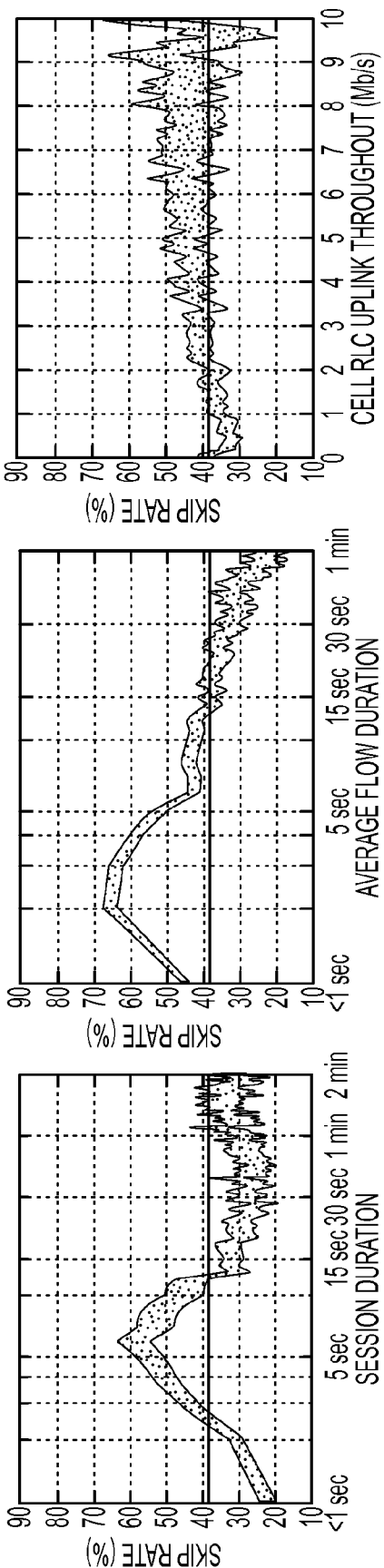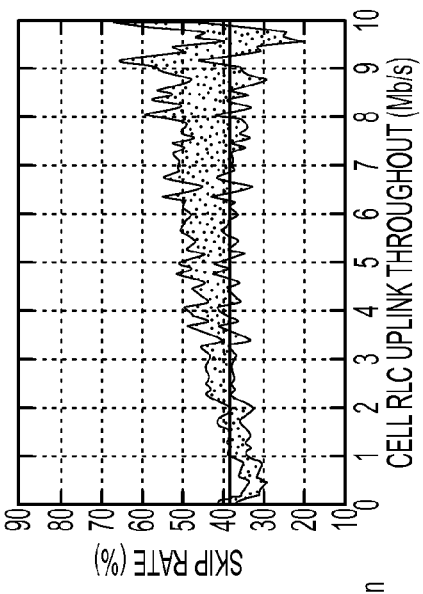

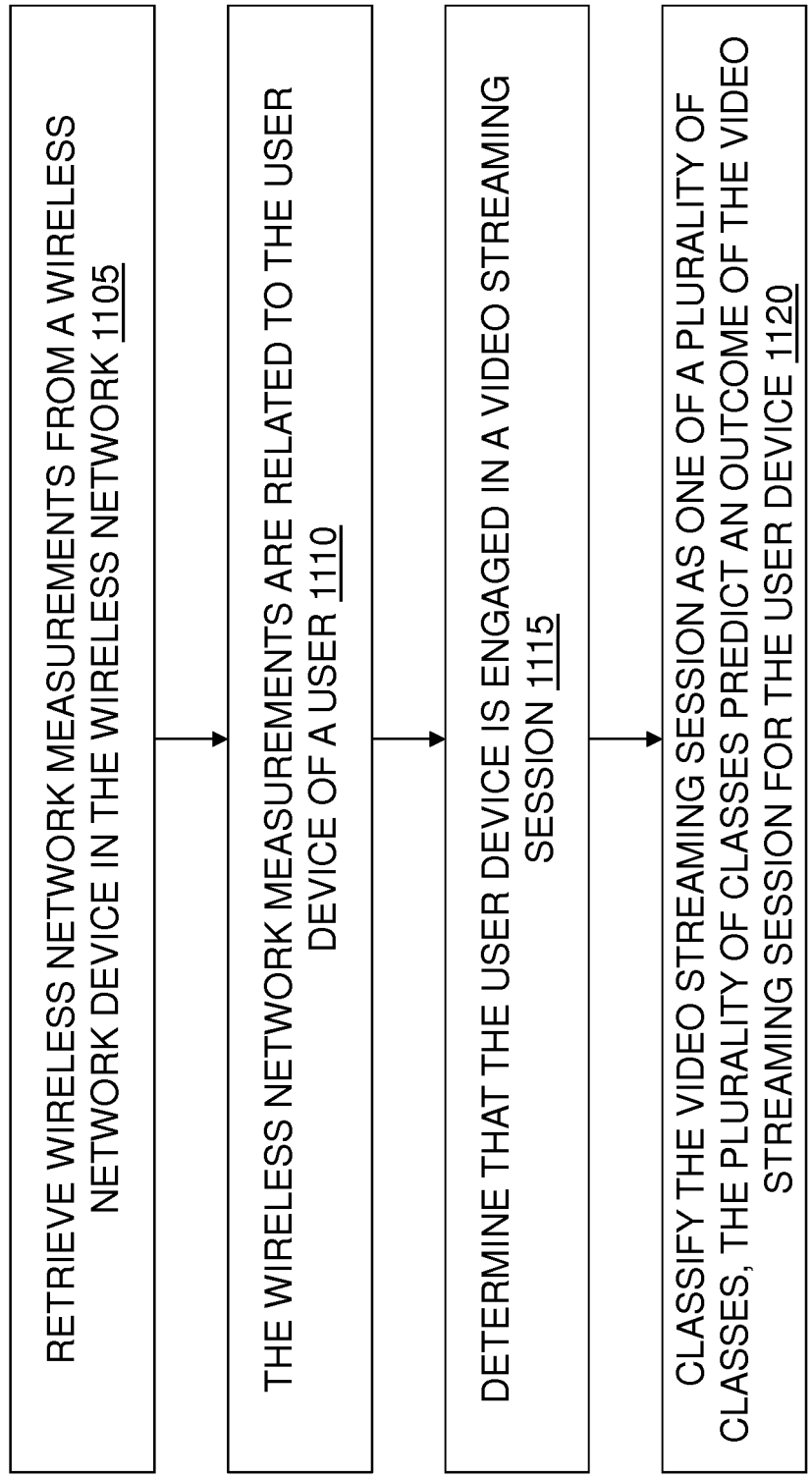

A
PREDICTING VIDEO ENGAGEMENT FROM WIRELESS NETWORK MEASUREMENTS

BACKGROUND

The present disclosure relates generally to communication services by a wireless network carrier, and more particularly, to predicting video engagement of a user device using wireless network measurement.

The Universal Mobile Telecommunications System (UMTS) is a third generation mobile cellular system for networks based on the GSM standard. UMTS is developed and maintained by the 3GPP (3rd Generation Partnership Project). UTRAN (short for "Universal Terrestrial Radio Access Network") is a collective term for the Node B's and Radio Network Controllers (RNCs) which make up the UMTS radio access network. This communications network, commonly referred to as 3G (for 3rd Generation Wireless Mobile Communication Technology), can carry many traffic types from real-time Circuit Switched to IP based Packet Switched.

The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node Bs. Despite the fact that they do not have to be physically separated, there is a logical interface between them known as the Iub. The RNC and its corresponding Node Bs are called the Radio Network Subsystem (RNS). There can be more than one RNS present in a UTRAN. There are four interfaces connecting the UTRAN internally or externally to other functional entities: Iu, Uu, Iub and Iur. The Iu interface is an external interface that connects the RNC to the Core Network (CN). The Uu is also external, connecting the Node B with the User Equipment (UE). The Iub is an internal interface connecting the RNC with the Node B. Also, there is the Iur interface which is an internal interface most of the time, but can, exceptionally be an external interface too for some network architectures. The Iur connects two RNCs with each other.

BRIEF SUMMARY

Exemplary embodiments include a method for predicting video engagement from network measurements for a user device connected to a wireless network. The method includes retrieving wireless network measurements from a wireless network device in the wireless network, wherein the wireless network measurements are related to the user device of a user, and determining that the user device is engaged in a video streaming session. A computer classifies the video streaming session as one of a plurality of classes, the plurality of classes predict an outcome of the video streaming session for the user device.

Other exemplary embodiments include an apparatus. The apparatus includes a processor and memory comprising computer-executable instructions that, when executed by the processor, cause the processor to perform operations for predicting video engagement from network measurements for a user device connected to a wireless network. The operations include retrieving wireless network measurements from a wireless network device in the wireless network, where the wireless network measurements are related to the user device of a user, and determining that the user device is engaged in a video streaming session. The processor classifies the video streaming session as one of a plurality of classes, in which the plurality of classes predict an outcome of the video streaming session for the user device.

Other exemplary embodiments include a computer program product, tangibly embodied on a computer readable medium, for predicting video engagement from network measurements for a user device connected to a wireless network, the computer program product including instructions that, when executed by a processor, cause the processor to perform operations. The operation include retrieving wireless network measurements from a wireless network device in the wireless network, where the wireless network measurements are related to the user device of a user, and determining that the user device is engaged in a video streaming session. The processor classifies the video streaming session as one of a plurality of classes, in which the plurality of classes predict an outcome of the video streaming session for the user device.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF EXEMPLARY EMBODIMENTS

Referring now to the drawings wherein like elements are numbered alike in the several FIGURES:

FIG. 3 illustrates a computer system with one or more software applications for predicting outcomes for video streaming sessions according to exemplary embodiments;

Figure 5:
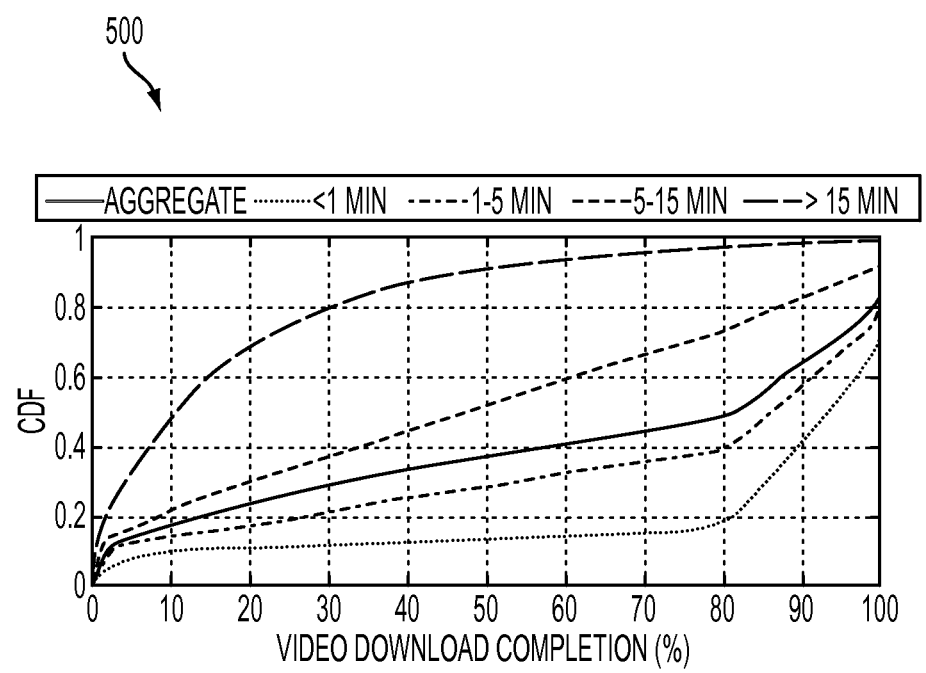
Figure 6A:
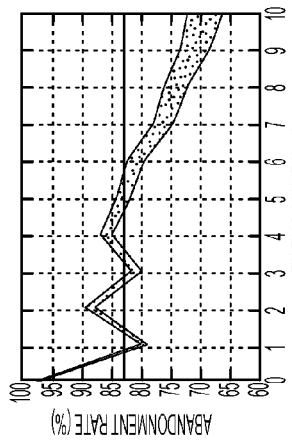
Figure 6D:
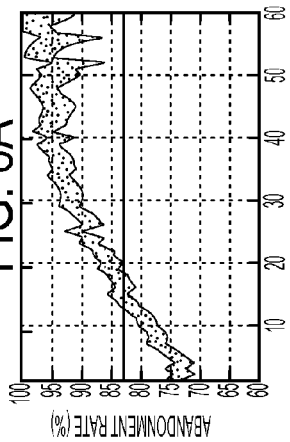
Figure 6G:
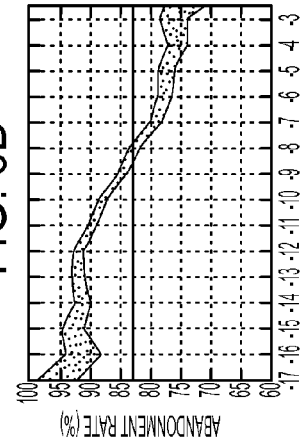
Figure 6B:
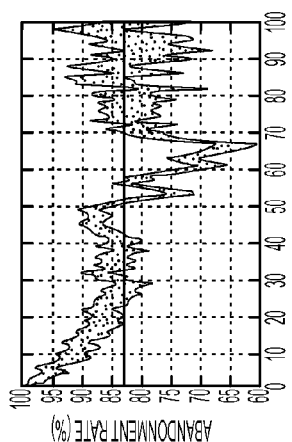
Figure 6E:
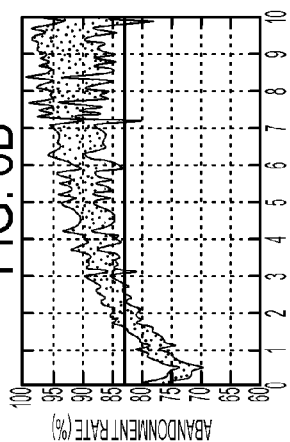
Figure 6H:
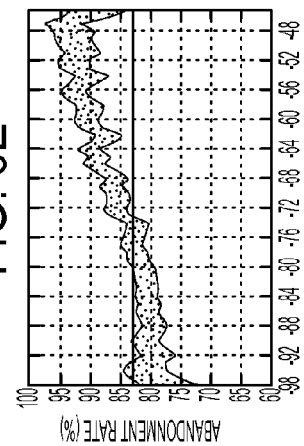
Figure 6C:
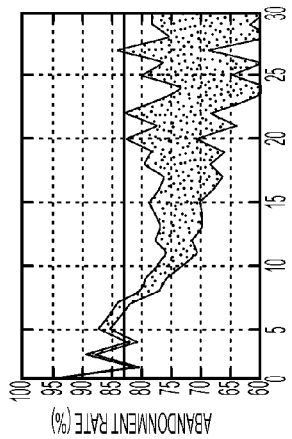
Figure 6F:
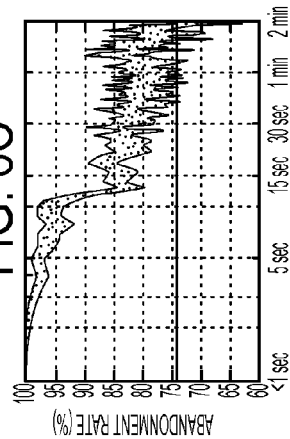
Figure 6I:
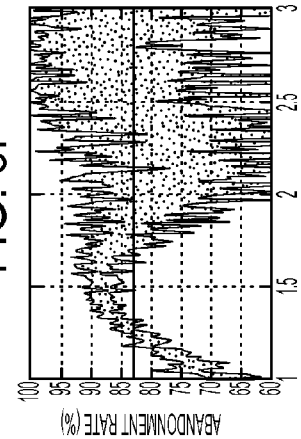
Figure 6J:
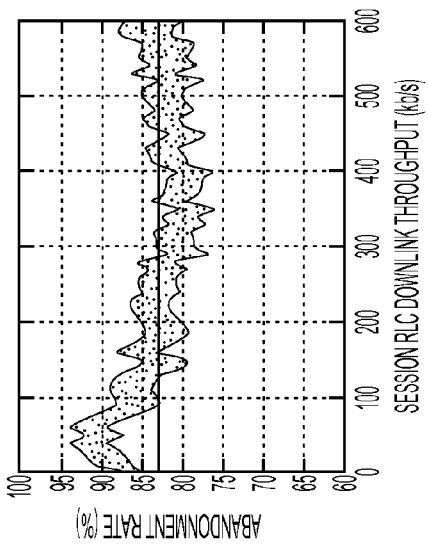
Figure 6K:
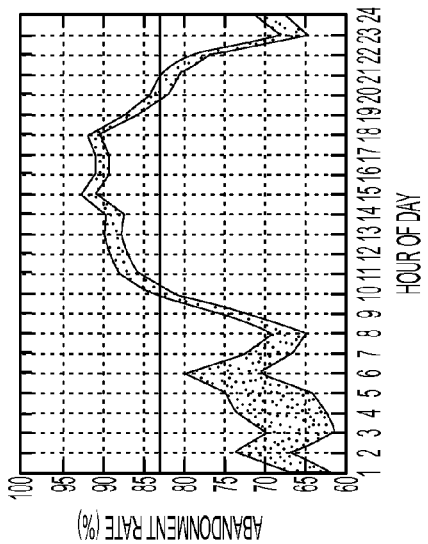
Figure 6L:
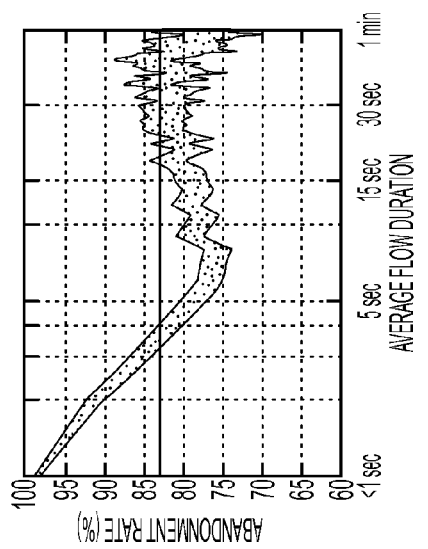
Figure 6M:
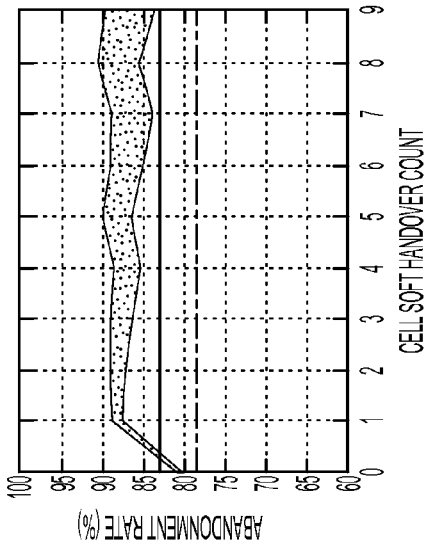
Figure 6N:
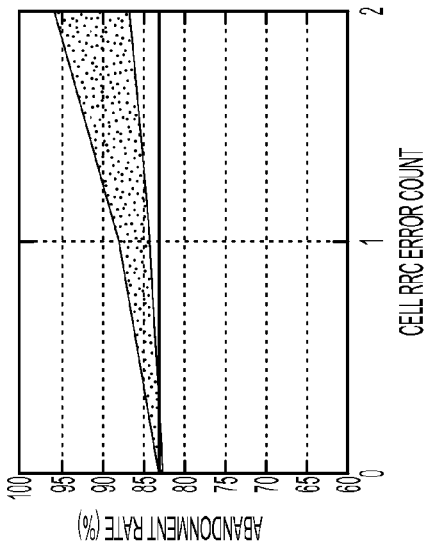
Figure 6O:
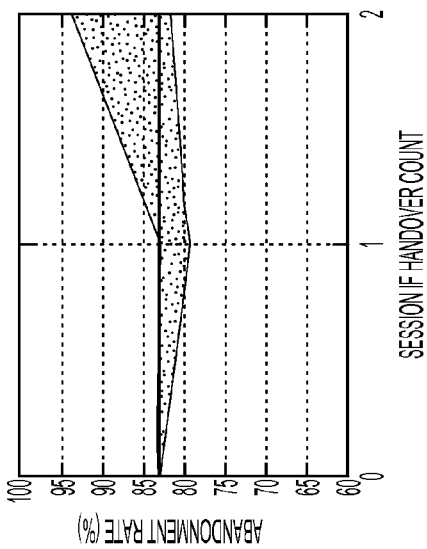
Figure 8A:
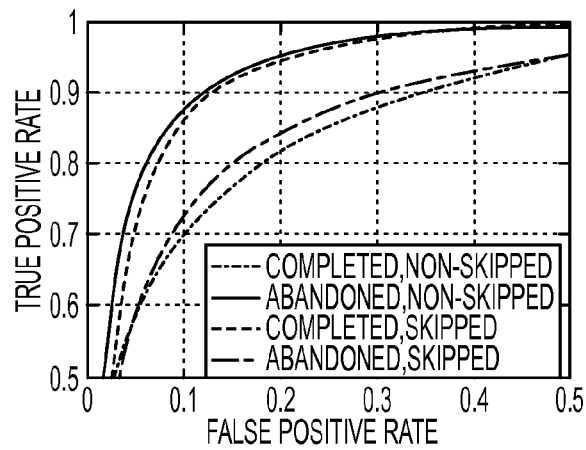
Figure 8B:
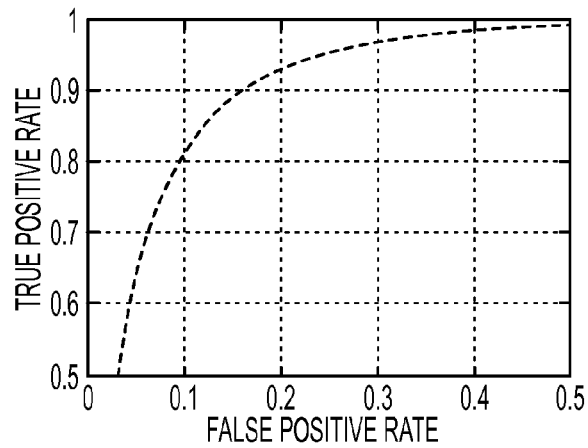
Figure 8C:
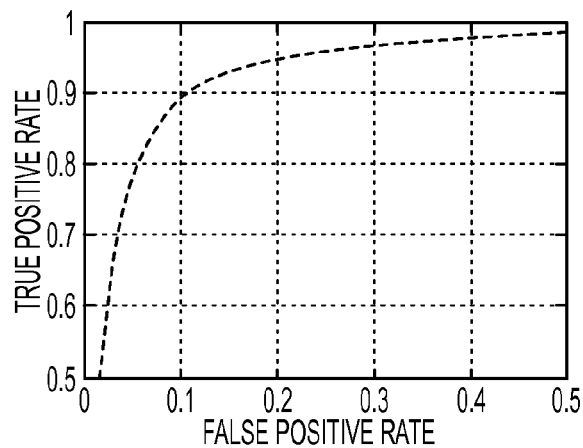
Figure 9:
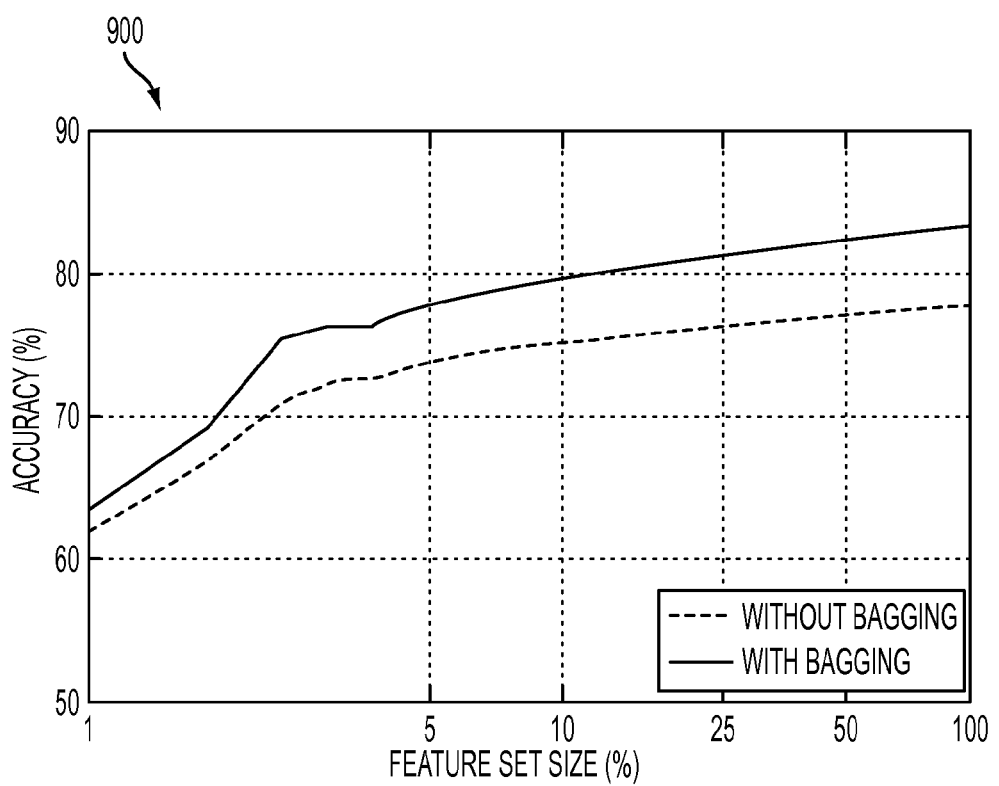
Figure 10A:
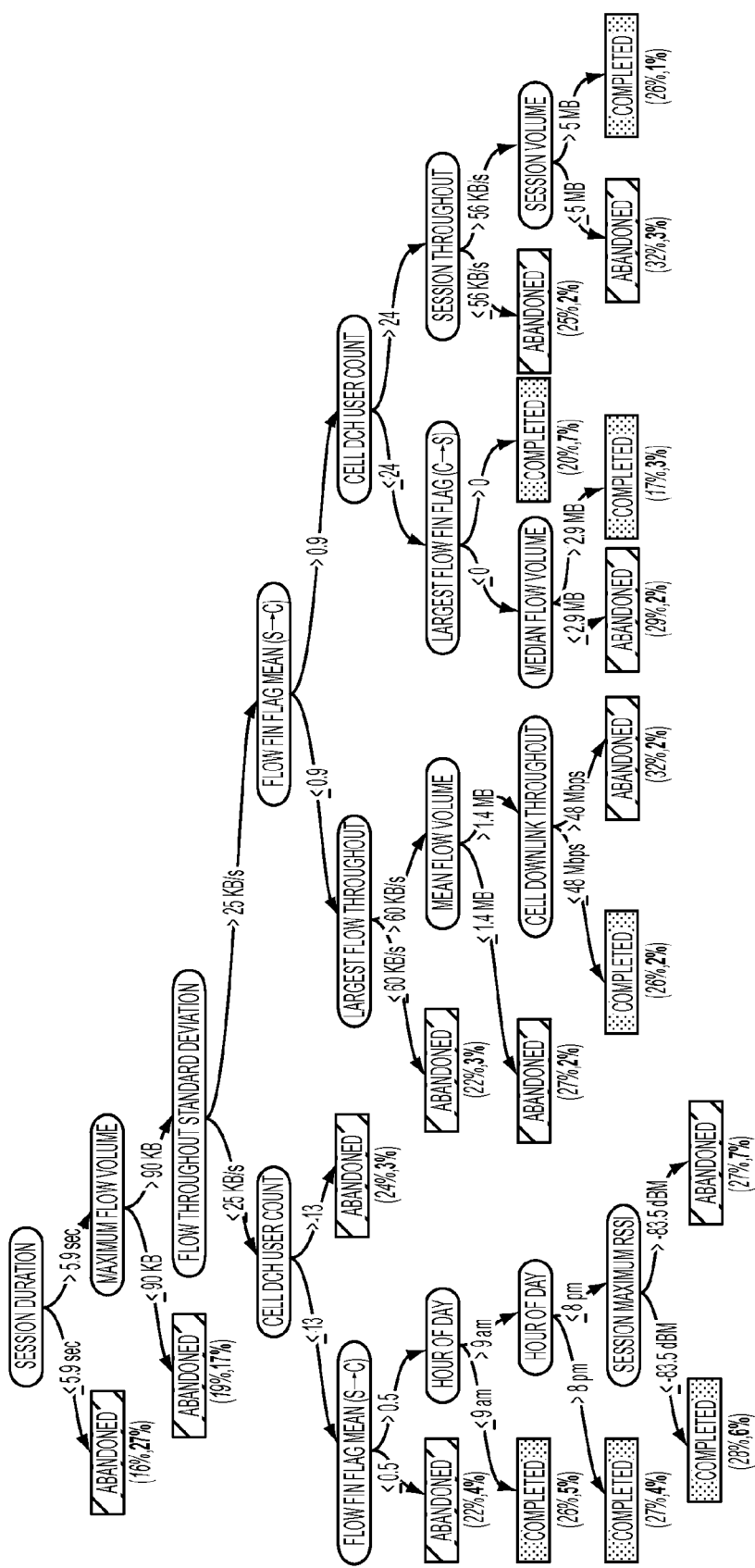
Figure 10B:
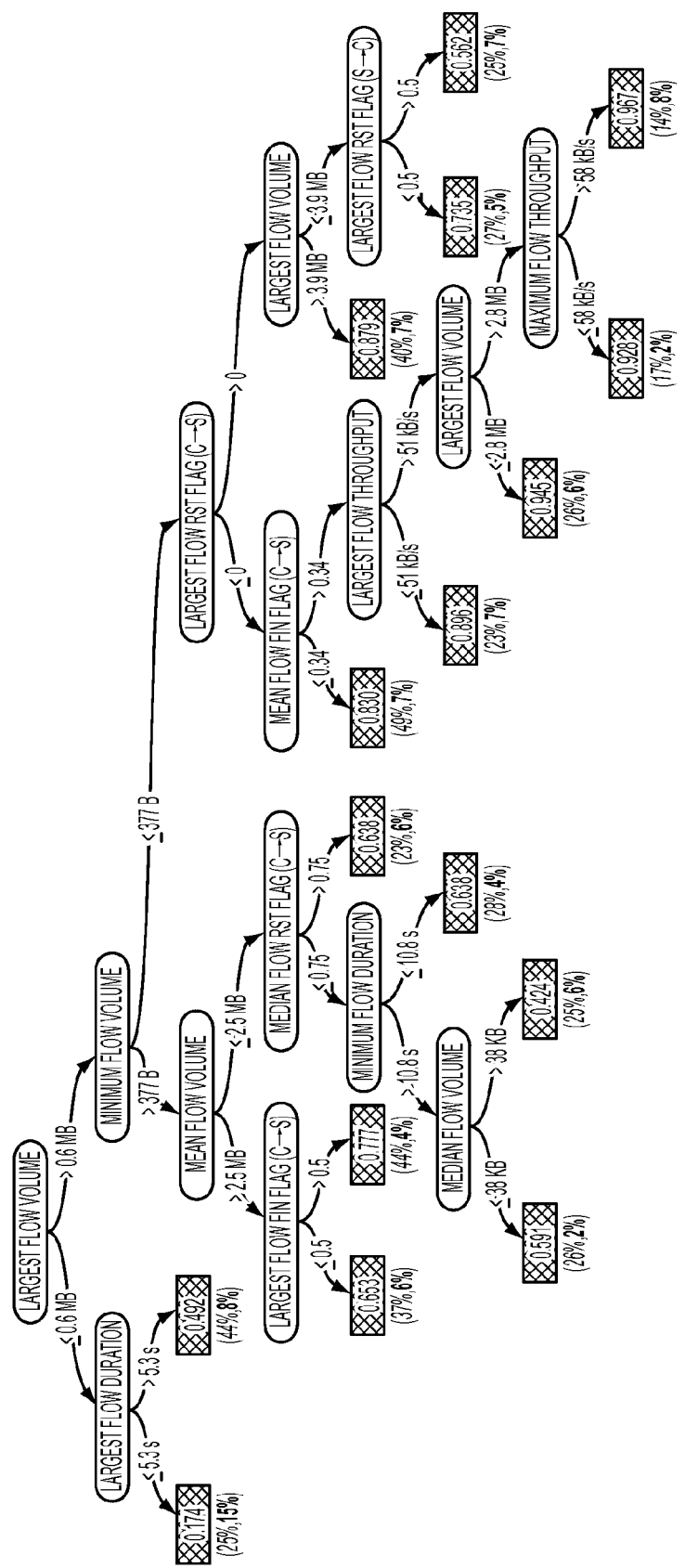
Figure 12:
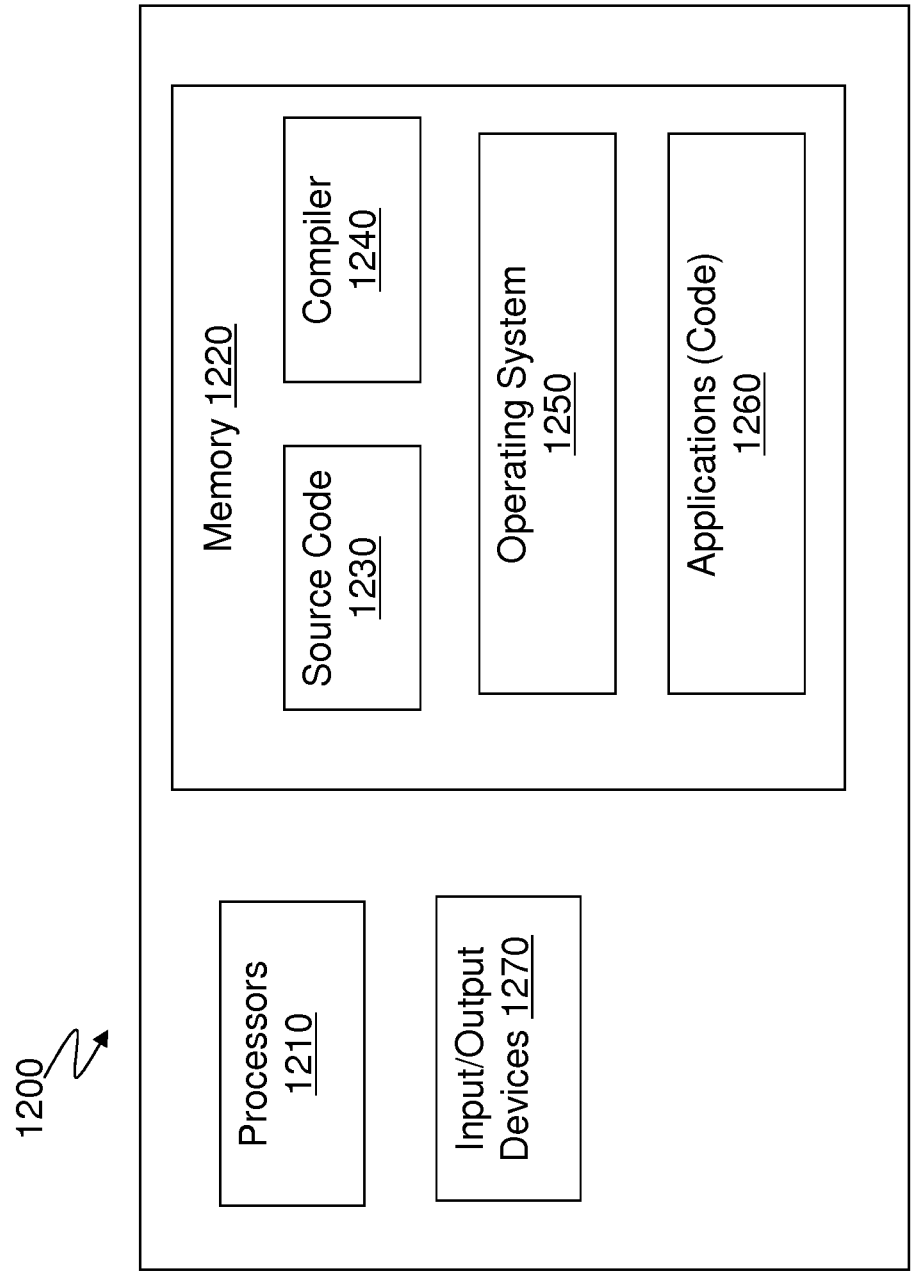

FIGS. 4A, 4B, 4C, and 4D illustrate examples of video streaming sessions for the four user engagement classes according to exemplary embodiments;

FIG. 5 illustrates a graph of the cumulative distribution function (CDF) of video download completion according to exemplary embodiments;

FIGS. 6A-6O illustrate graphs of the abandonment rate distributions of prominent features in the network measurements according to exemplary embodiments;

FIGS. 7A-7F illustrate graphs of the skip rate distributions of prominent features in the network measurements according to exemplary embodiments;

FIGS. 8A, 8B, and 8C illustrate the receiver operating characteristic (ROC) threshold plots for various class pairs according to exemplary embodiments;

FIG. 9 illustrates a graph of accuracy vs. feature set size for completed vs. abandoned classification according to exemplary embodiments;

FIG. 10A illustrates a decision tree model for completed vs. abandoned class pair according to exemplary embodiments;

FIG. 10B illustrates a regression tree model for video download completion according to exemplary embodiments;

FIG. 11 illustrates a method for predicting video engagement from network measurements for a user device connected to the wireless network according to exemplary embodiments; and FIG. 12 illustrates an example of a computer having capabilities and features which may be included and/or incorporated in exemplary embodiments.

The detailed description explains the exemplary embodiments, together with advantages and features, by way of example with reference to the drawings.

DETAILED DESCRIPTION OF DRAWINGS

Mobile network operators have a significant interest in the performance of streaming video on their networks because network factors directly influence the quality-of-experience. However, unlike video service providers (such as Netflix, Hulu, YouTube, etc.) network operators are not privy to the client- or server-side logs typically used to measure key video performance metrics, such as user engagement.

To address this issue, the disclosure presents a large scale study characterizing the impact of cellular network performance on mobile video abandonment (a measure of user engagement) from the perspective of a network operator. The study on a month-long anonymized data set from a major cellular network includes the following according to embodiments. First, the disclosure quantifies the effect that 31 different cellular network factors have on user behavior in mobile video. Results provide network operators (of a cellular network) direct guidance on how to improve user engagement; for example, improving mean signal-to-interference ratio ($E_c I_o$) by 1 dB reduces the likelihood of video abandonment by 2%. Second, the disclosure models the complex relationships between these cellular network factors and video abandonment, enabling operators to monitor mobile video user engagement in real-time. According to an embodiment, the model can predict whether a user completely downloads a video with more than 87% accuracy by observing only the initial 10 seconds of video streaming sessions. Moreover, the model achieves better accuracy than prior models (in the state-of-the-art) that require video service provider logs, and embodiments only use standard radio network statistics and/or TCP/IP headers available to network operators of the wireless network (i.e., cellular network).

Online video services such as YouTube, Netflix, and Hulu are immensely popular on mobile networks also referred to as wireless communication networks (i.e., cellular networks), with one equipment vendor estimating that video makes up more than half of all mobile data traffic and estimating that video will grow by a factor of 16 by 2017. Therefore, it is beneficial for mobile network operators to monitor the user experience of video streaming and understand how network characteristics and performance influence the user experience of video streaming.

Unfortunately, prior approaches (in the state-of-the-art) for monitoring and understanding the user experience of video are insufficient for mobile network operators of cellular networks. Recent seminal work in the state-of-the-art investigated how video streaming quality influences important user engagement metrics, such as video abandonment rate. However, these studies in the state-of-the-art rely on client-side instrumentation to measure video quality metrics such as buffering, startup delay, and bitrate. This client-side instrumentation (e.g., from client logs stored in the user device such as a cellular phone or tablet) is not available to wireless network operators of the cellular network, so the ability to measure user engagement using only network-side measurements is central from their perspective. Other work in the state-of-the-art used network traffic analysis to study video streaming volume and abandonment rates in wired and wireless networks. However, these techniques use deep-packet-inspection (DPI) to extract information beyond TCP/IP headers, which requires significant computational resources to employ at the scale of network carriers and can pose privacy problems in practice. DPI typically reads contents of packets beyond the TCP/IP header boundary, such as HTTP headers and application content. Such techniques are computationally expensive because they must examine more bytes of a packet and may require more memory state to track. Moreover, DPI raises potential privacy and regulatory concerns as DPI may cause a carrier to examine information that is classified as sensitive personal information. Moreover, these studies (in the state-of-the-art system) did not provide insight into how network characteristics and performance influence abandonment rates.

To address these limitations, the study in the disclosure is based on anonymized data sets collected from the core network and radio access network of a tier-1 cellular network in the United States, although not limited to such data. The present disclosure analyzes 27 terabytes of video streaming traffic from nearly half a million users in this data set. According to embodiments, the analysis makes two exemplary contributions: First, the analysis is the first to quantify the impact that network characteristics have on mobile video user engagement in the wild (i.e., in the natural data collection environment). Embodiments quantify the effect that 31 different cellular network factors have on video abandonment rate and video skip rate (e.g., fast forward). In particular, the disclosure quantifies user engagement by labeling video streaming sessions in the data set as completed/abandoned and skipped/non-skipped, and then evaluates the extent to which core network and radio network factors correlate with abandonment rate and skip rate. These different cellular network factors include transmission control protocol (TCP) flow throughput, flow duration, handover rate, signal strength, and the physical location's land cover type. According to embodiments, the results provide wireless network operators with direct guidance on how to improve user video engagement. For example, as noted herein, improving the mean signal-to-interference ratio ($E_c/I_o$) by 1 decibel (dB) reduces the likelihood of video abandonment by 2%, and video abandonment rate increases by 25% during peak load hours as compared to off-peak hours.

Second, the present disclosure shows how a wireless network provider can monitor mobile video user engagement using only standard radio network statistics and/or TCP/IP flow records, which is a needed for continuous monitoring at scale and for mitigating privacy concerns. Moreover, the approach can predict video abandonment very early in a video session, which can help future networks decide which users to optimize performance for (e.g., using long-term evolution (LTE) self-organizing networks). Specifically, the disclosure models the complex relationships between network factors and video abandonment. Although not limited to any one type of algorithm for generating decision trees, the disclosure has found that the C4.5/M5P algorithm with bootstrap aggregation can build decision/regression tree models that accurately predict video abandonment according to embodiments. Results show that embodiments can predict whether a video streaming session is abandoned or skipped with more than 87% accuracy by observing only the initial 10 seconds of the video streaming session. The model in embodiments achieves better accuracy than prior models (in the state-of-the art) that require video service provider logs. This accuracy is achieved in embodiments by (only) using standard radio network statistics and/or TCP/IP headers readily available to wireless network operators. Moreover, as a series of if-then-else branches in the decision tree, the model can process flow records efficiently in real-time.

For ease of understanding, sub-headings are utilized for explanation purposes and not limitation. In Section 1, details of the data collection process are discussed. Section 2 presents the characterization of mobile/wireless video streaming performance in a cellular network and its impact on user video engagement. A machine learning based model for user video engagement is developed and the results are presented in Section 3.

1. Data

To study mobile video streaming performance, a computer system, such as the computer system 300, collected flow-level logs from a tier-1 cellular network in the United States. FIG. 3 shows the computer system 300 with one or more software applications 31 stored in memory 30 according to an embodiment. The software application 31 may include, be integrated with, and/or function with one or more algorithms 32 as discussed herein. The algorithms may include machine learning algorithms, data mining algorithms, decision tree learning algorithms, classification algorithm, etc., as understood by one skilled in the art. In one case, the software application 31 includes the C4.5 and M5P algorithms with bootstrap aggregation. A database 35 may store the collected data sets (including network measurements), along with network statistics, models, training data, etc., discussed herein. The computer system 300 also includes processors 21, user interfaces 22 (such as keyboards, touch screens, mouse, etc.) for interfacing with the computer system 300, network interfaces 23 (for connecting and tapping into the wired connections/cables and equipment (such as RNCs, SGSNs, GGSNs in the cellular network shown in FIG. 1).

Next, discussion of video streaming in cellular networks, description of the data collection methodology, and some high-level statistics of the collected data set are provided.

1.1 Cellular Network

Figure 1:
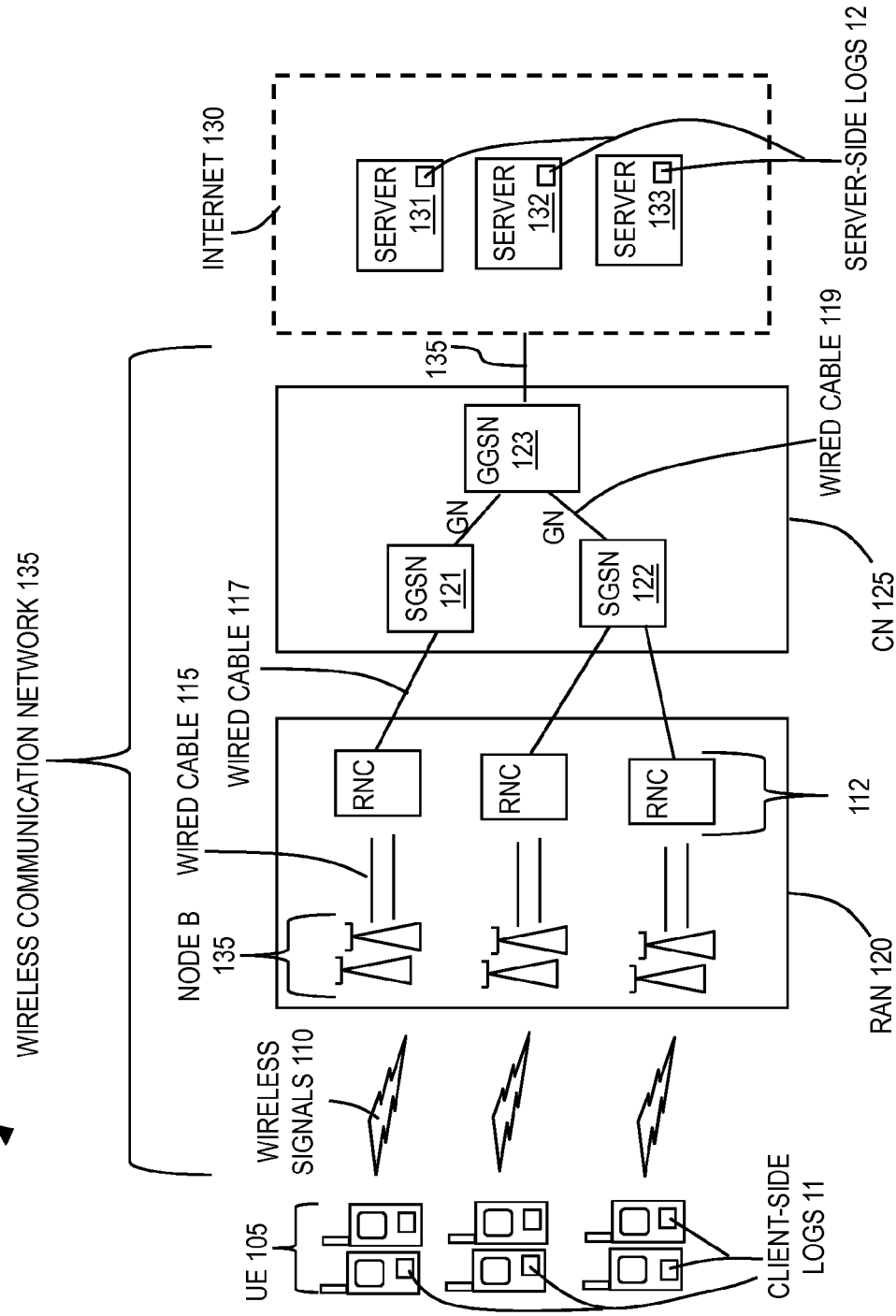
FIG. 1 illustrates a universal mobile telecommunications system (UMTS) cellular network according to exemplary embodiments.

A typical universal mobile telecommunications system (UMTS) cellular network, shown in FIG. 1, can be visualized as consisting of two major components: Radio Access Network (RAN) 120 and Core Network (CN) 125. The RAN 120 consists of NodeBs 135 and Radio Network Controllers (RNCs) 112. The UMTS is a third generation mobile cellular system for networks based on the GSM standard.

Each NodeB 135 has multiple antennas, where each antenna corresponds to a different cell sector. A user via user equipment (UE) 105 connects to an active set of one or more cell sectors in the RAN 120 via wireless signal 110. The UE 105 periodically selects a primary or serving cell among the active set based on their signal strength information. From the active set, only the primary cell actually transmits downlink data to the UE 105. The traffic generated by the UE 105 is sent to the corresponding NodeB 135 by cell sectors. Each RNC 112 controls and exchanges traffic with multiple NodeBs 135, each of which serves many users in its coverage area. RNCs 112 manage control signaling such as Radio Access Bearer (RAB) assignments, transmission scheduling, and handovers. Each UE 105 negotiates allocation of radio resources with the RAN 120 based on a wide range of factors, such as available radio resources and signal strength.

CN 125 consists of Serving GPRS Support Nodes (SGSNs) 121, 122 facing the user and Gateway GPRS Support Nodes (GGSNs) 123 facing the Internet 130 and other external networks. Servers 131, 132, 133 may be popular video streaming providers (or video service providers) such as Hulu, Netflix, and YouTube. UEs 105 respectively transmit to and receive traffic from NodeBs 135 via wireless signals 110. RNCs 112 transmit to and receive traffic from NodeBs 135 via wired cables 115. RNCs 112 send traffic from NodeBs 135 to SGSNs 121, 122 via wired cables 117; the SGSNs 121, 121 then send traffic to GGSNs 123. GGSNs 123 eventually send traffic to and receive traffic from external networks, such as the Internet 130 via wired cables 135. For data connections, the IP layer of the UE 105 is peered with the IP layer of GGSNs 123 in the form of tunnels known as Packet Data Protocol (PDP) contexts. These tunnels, implemented as GPRS Tunneling Protocol (GTP) tunnels, carry IP packets between the UEs 105 and their peering GGSNs 123. From the perspective of an external network such as the Internet 130, a GGSN 123 connecting a CN 125 to the Internet 130 appears just like an IP router, and the UEs 105 that connect through the GGSN 123 appear as IP hosts behind this router.

1.2 Data Collection

For the study herein, the computer system 300 simultaneously collected the wireless/cellular network measurements from the RAN 120 and the CN 125 of a tier-1 cellular network in the United States. This data collection covers a major metropolitan area in the Western United States over the duration of one month in 2012. The RAN data set is collected at the RNCs 112 and contains event-driven signaling information such as current active set, RAB state, handovers, bitrate, signal strength, and radio resource control (RRC) requests from users and corresponding responses from the network. The CN data set is collected from the Gn interfaces (on wired cables 119) between SGSNs 121, 122 and GGSNs 123, and contains flow-level information of video streaming traffic such as server IP and port, client IP and port, flow duration, TCP flags, anonymized user identifier (IMSI), and anonymized device identifier (IMEI). These fields require only TCP/IP and/or GTP level information, which is efficiently collected. In order to determine the ground-truth of video abandonment, the computer system 300 also collected the following HTTP-level information: URL, host, user agent, content type, content length, and byte-range request from clients and response from servers. In one embodiment, the computer system 300 may be implemented in the RNCs 112 and/or the SGSNs 121, 122.

Large scale monitoring tools often do not collect HTTP information because collecting HTTP information requires processing hundreds of bytes of text beyond the 40-byte TCP/IP header. Thus, it is important that day-to-day monitoring does not require its collection at scale. In the present disclosure, all device and user identifiers (e.g., IMSI, IMEI) in the data sets are anonymized to protect privacy without affecting the usefulness of the analysis. The data sets do not permit the reversal of the anonymization or re-identification of users.

1.3 Extracting Video Traffic

To minimize the confounding factors that different content providers (live vs. video-on-demand), connectivity (cellular vs. cable), and device type (mobile vs. desktop) could have on the network-centric analysis, the experimenters have chosen to focus on the most popular video service provider in our cellular network data set. This provider (anonymized for business confidentiality) serves user generated content on demand, and according to a recent study, it serves over 37% of all video objects. This provider streams videos using progressive download with byte-range requests, which is the most common protocol currently in use. The conclusions drawn in this paper apply to 9 of the 14 most popular mobile video content providers as they use the same protocol. Since the collected data contains traffic records for all types of content, video streaming traffic is separated from the rest. Toward this end, the HTTP host and content-type headers are used by the computer system 300 to determine and separate the video streaming traffic from other TCP/IP traffic. Also, video traffic can be separated based only on the server IP and port (of servers 131, 132, 133), since all video streaming traffic is served by a known block of content delivery network or content distribution network (CDN) cache servers.

Figure 2:
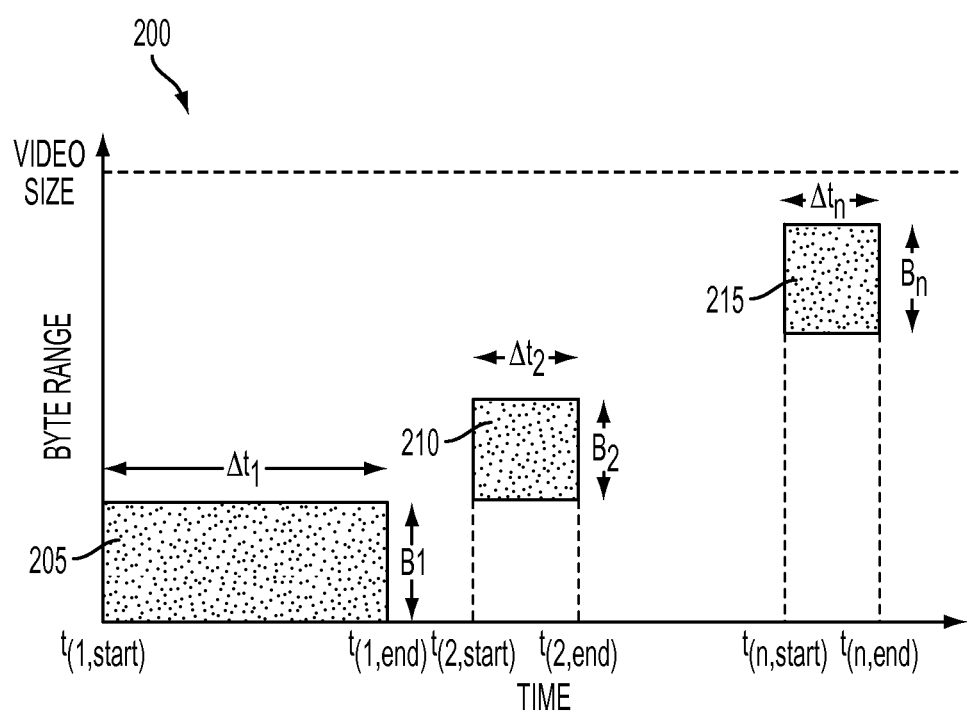
FIG. 2 illustrates a graph of a video streaming session that involves multiple HTTP byte-range server response flows according to exemplary embodiments.
Figure 4A:
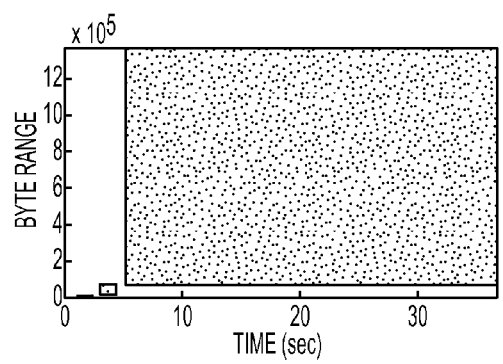
Figure 4B:
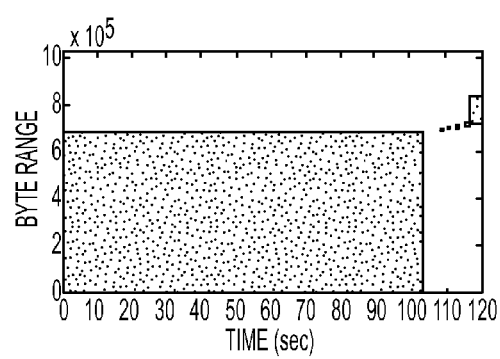
Figure 4C:
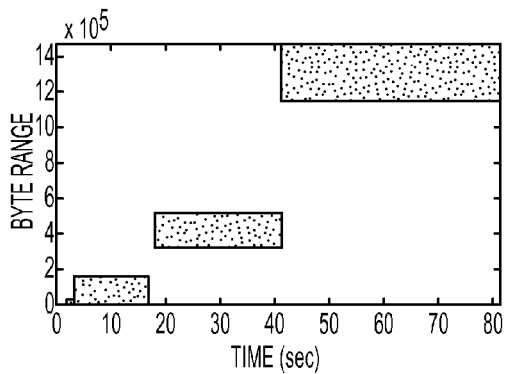
Figure 4D:
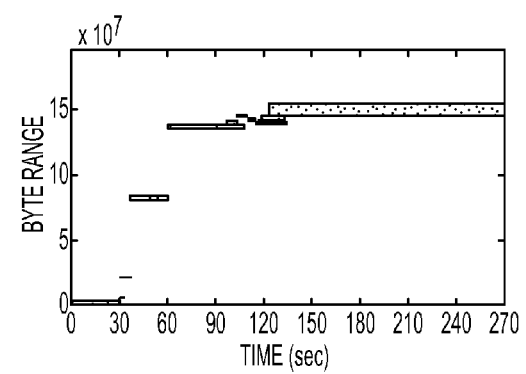

A video is progressively downloaded in one or multiple HTTP byte-range requests, which represent different portions of the video. FIG. 2 is a graph 200 that illustrates a video streaming session that involves multiple HTTP byte-range server response flows. The x-axis represents time, which starts with the first HTTP byte-range server response flow. The y-axis represents byte-range of the video file with maximum value same as the video file size, which is highlighted by the horizontal broken line. Consequently, each shaded rectangle 205, 210, 215 represents a distinct HTTP byte-range server response flow. Note that flows may have different byte-range lengths and durations, they may be overlapping, and there may be time gaps between consecutive flows.

For the purpose of this analysis, HTTP flows are grouped into video sessions based on a unique ID that is the same in the URLs of each video session. In practice, this disclosure found that HTTP flows can be grouped into sessions without any HTTP information. In particular, by looking for a change in the server IP to determine when a new video session for a user starts, the computer system 300 can detect session starts correctly with 98% accuracy. This is because videos are served from a CDN and different videos are likely served from different cache servers. Even if all videos were served from a single server, it was found that the computer system 300 can still detect session starts with 97% accuracy using a simple decision tree classifier trained on the size of and inter-arrival time gap between HTTP flows. Thus, it is concluded that TCP/IP information would be sufficient to detect and group HTTP flows into video sessions as discussed herein via computer system 300.

1.4 Video Traffic Statistics

Next, the disclosure discusses several statistics of the collected data set such as aggregate statistics, container types, encoding bitrates, and video player types. Overall, the data set consists of more than 27 terabytes worth of video streaming traffic, from more than 37 million flows, from almost half a million users over the course of one month. There is a distribution of video streaming traffic with respect to container types. The most common container types are: (1) 3GP (3GPP file format), (2) MPEG-4, (3) FLV (Flash), (4) WebM, and (5) MP2T (MPEG transport stream). It was observed that a vast majority, almost 70%, of video streaming traffic uses the 3GPP container type followed by MPEG-4 and Flash container types as distant $2^{nd}$ and 3rd most popular, respectively. Only a small fraction, less than 2%, of the video streaming traffic belongs to containers types used for live content, and live content was exclude these from the analysis since the study's focus is on video-on-demand streaming. Further analysis of video encoding bitrate showed that a majority of video streaming traffic belongs to lower bitrates, which correspond to 144/240 p video resolution. 240 p is the mostly commonly used video resolution. Only a small fraction of video streaming traffic belongs to higher video resolutions. For example, less than 5% video streaming traffic belongs to high definition (HD) 720 p content.

From plotting the cumulative distribution function (CDF) of video duration (not shown), the experimenters determined that more than 70% videos are less than 5 minutes long and only 10% videos are longer than 15 minutes. This type of skewed distribution is expected for content providers that serve user generated content. Finally, from plotting the CDF of users across video player types (reverse-sorted with respect to fraction of users), the study identified video player types using the available user agent information, which enables the experimenters to differentiate among video players on different hardware models, operating system versions, and web browsers. The data set contains several dozen distinct video player types whose distribution is highly skewed, i.e., a small fraction of video player types account for most users in our data set. Specifically, top-5 player types account for approximately 80% users in our data set and they represent both iOS- and Android-based devices.

1.5 Quantifying User Video Engagement

As a first step towards analyzing user engagement, the disclosure discusses two ways to quantify it: discrete and continuous. For discrete quantification of user video engagement, the computer system 300 first uses a nominal variable that represents the following classes: completed and abandoned. The completed class represents video streaming sessions in which the download process reaches the end-point. The abandoned class represents video streaming sessions in which the download process is abandoned before reaching the end-point. In the collected data set, 21.2% of the video streaming sessions belong to the completed class and 78.8% of the video streaming sessions belong to the abandoned class. Additionally, the disclosure also used a nominal variable that represents the following classes: skipped and non-skipped. The skipped class represents video streaming sessions in which the download process includes at least one seek-forward between the start-point and the last byte downloaded. The non-skipped class represents video streaming sessions in which the download process does not include seek-forward between the start-point and the last byte downloaded. In the collected data set, 33.9% of the video streaming sessions belong to the skipped class and 66.1% of the video streaming sessions belong to the non-skipped class. Combining the aforementioned user engagement classification schemes, the computer system 300 can define the following four non-overlapping classes: (1) completed, non-skipped, (2) abandoned, non-skipped, (3) completed, skipped, and (4) abandoned, skipped. In the data set, 17.6% of the video streaming sessions belong to the completed, non-skipped class, 48.5% of the video streaming sessions belong to the abandoned, non-skipped class, 3.6% of the video streaming sessions belong to the completed, skipped class, and 30.3% of the video streaming sessions belong to the abandoned, skipped class. FIGS. 4A, 4B, 4C, and 4D (generally referred to as FIG. 4) illustrate examples of video streaming sessions for the four user engagement classes according to an embodiment. As mentioned earlier and observable in FIG. 4, sessions generally consist of more than one flow. On average, a video streaming session in the data set consists of 11 flows, where earlier flows tend to be larger than the following flows. This trend is because video players tend to aggressively download larger chunks to fill up the available buffer during the initial buffering phase of a video streaming session. The download rate in this initial phase is limited by the end-to-end available bandwidth. Afterwards in the steady state phase, the remaining video is generally downloaded in multiple smaller flows. The download rate in this phase depends on the video encoding rate and the playback progress. For continuous quantification of user video engagement, the computer system 300 utilizes a continuous variable representing the fraction of video download completion. FIG. 5 is graph 500 that shows the cumulative distribution function (CDF) of video download completion according to an embodiment. Comparing videos of different durations, experimenters determined via computer system 300 that shorter videos achieve better download completion than longer videos. For aggregate distribution, almost 15% of video streaming sessions are abandoned with less than 5% download completion. However, after the 5% completion mark, the distribution is fairly uniform until the 80% completion mark. The initial modality in the distribution indicates abandonment that is likely either because users tend to sample videos or due to longer join times. The later modality in the distribution (excluding the 100% completion mark) indicates abandonment that is likely either because users lose interest in the content (e.g., due to video closing credits or advertisements) or due to much better download completion for shorter videos in the initial buffering phase. Note that definitions of user engagement detect abandonment and skips only during the download phase of a video (by the computer system 300)1 however, the computer systems 300 does not detect a video abandonment or skip if these events occur after a video has downloaded completely (e.g., due to lack of user interest). Nonetheless, wireless network operators are typically not interested in those events after the video has downloaded completely because they are unlikely to be influenced by wireless network factors.

2. Analysis of Network Factors

One goal is to understand the influence of cellular network factors on user engagement. Toward this end, this section presents an in-depth analysis of the relationships between network factors and video abandonment.

The study first itemized a wide range of factors that can potentially impact and/or be influenced by mobile video user engagement. Towards this end, the approach is to design a comprehensive list of features from the information available in both CN 125 and RAN 120 data sets via the computer system 300. It is noteworthy that while features extracted from the RAN data set are only applicable for cellular networks, features extracted from the CN data set are applicable for other kinds of wired and wireless networks as well. Tables 1A and 1B (generally referred to as Table 1) summarize the 31 network factors/features of the measured/extracted from the wireless communication network 135 (i.e., cellular network) by the computer system 300. In Table 1, i denotes the flow index of a video session with N flows. Table 1A shows the CN factors and Table 1B shows the RAN factors.

TABLE 1A

| Feature | Description |
| --- | --- |
| Flow volume | ($B_i$) The number of bytes transferred during the $i^{th}$ flow. (Summary stats) |
| Flow duration | ($t_i$) The duration (in seconds) from the SYN packet to the last packet in the $i^{th}$ flow. (Summary stats) |
| Flow TCP throughput | ($T_i$) The ratio of flow volume to flow duration in the $i^{th}$ flow, in kilobytes per second (KB/s). (Summary stats) |
| Flow inter-arrival time | ($I_i$) Time (in seconds) between the end of the $i^{th}$ flow and the start of the $i + 1^{th}$ flow. (Summary stats) |
| Flow flags | $FIN_i$ and $RST_i$ respectively denote the number of packets with TCP-Finish (no more data from sender indicating completion) and TCP-Reset (reset the connection indicating some unexpected error) flags set in the ith flow. Based on the direction of packet transfer, experimenters distinguish between client-to-server (c→s) and server-to-client (s→c) flags. (Summary stats) |
| Largest flow volume | ($B_j$) The largest flow volume among all flow volumes, where j denotes the index of this flow. |
| Largest flow duration | ($t_j$) The duration of the $j^{th}$ flow. |
| Largest flow TCP throughput | ($T_j$) The throughput of the $j^{th}$ flow. |
| Largest flow flags | $FIN_j$ and $RST_j$ respectively denote the number of packets with TCP-Finish and TCP-Reset flags set in the $j^{th}$ flow. Experimenters distinguish between c→s and s→c flags. |
| Number of flows | (N) The total number of flows in a session. |
| Session volume | (B) The sum of all flow volumes in a session. |
| Session duration | (t) The sum of all flow durations in a session. $t = \Sigma_{i=1}^{N} t_i$ |
| Session TCP throughput | (T) The average throughput of a session. $T = \Sigma_{i=1}^{N} B_i / \Sigma_{i=1}^{N} t_i$. |
| Session inter-arrival time | (I) The sum of all flow inter-arrival times (in seconds) in a session |
| Session flags | (FIN and RST) respectively denote the number of packets with TCP-Finish and TCP-Reset flags set in a session. Experimenters distinguish between c→s and s→c flags. |

TABLE 1B

| Feature | Description |
| --- | --- |
| Flow volume | ($B_i$) The number of bytes transferred during the $i^{th}$ flow. (Summary stats) |
| # soft handovers | ($H_S$) This handover occurs when a cell is added or removed from the active set. (Session- and cell-level) |
| # inter-frequency handovers | ($H_{IF}$) This type of handover occurs when a UE switches to cell sector of the same or different NodeB with different operating frequency. (Session- and cell-level) |
| # IRAT handovers | ($H_{RAT}$) This type of handover occurs when a UE switches between different radio access technologies (e.g., UMTS and GPRS). (Session- and cell-level) |
| # RRC failure events | A RRC failure event is logged when a request by a user to allocate more radio resources is denied by the respective RNC due to network overload or other issues. (Session- and cell-level) |
| # admission control failures | These events occur when a user cannot finish the admission control procedure often due to lack of available capacity. (Session- and cell-level) |
| Received signal code power | RSCP is the RF energy of the downlink signal obtained after the correlation and descrambling process. It is usually measured in decibel milliwatt (dBm). (Summary stats) |
| Signal energy to interference | This ratio ($E_c/I_o$) denotes the ratio of the received energy to the interference level of the downlink common pilot channel. It is usually measured in dB. (Summary stats) |
| Received signal strength | RSSI takes into account both RSCP and $E_c/I_o$. It is usually measured in dBm. It is defined as: RSSI = RSCP − $E_c/I_o$. (Summary stats) |
| Size of active set | (SAS) The number of unique cell sectors in the active set. (Summary stats) |
| Radio access bearer state | Our measurement apparatus distinguishes among 84 different RAB states. RAB state encodes information about RRC state (e.g., FACH shared channel vs. DCH dedicated channel), RAB type (e.g., interactive vs. streaming), and maximum data rate. Since a session may have multiple RAB states over time, experimenters use the most common state for session-level and top-3 most common states for cell-level features. |
| Uplink RLC throughput | (TU) The uplink data rate for UE in the DCH state (in kbps). (Session- and cell-level summary stats) |
| Downlink RLC throughput | (TD) The downlink data rate for UE in the DCH state (in kbps). (Session- and cell-level summary stats) |
| # Users in DCH state | (UDCH) Users served by the representative cell over a window of 1 hour. |
| Frequency | The operating frequency of the representative cell. |
| Landcover | A nominal variable that defines the geographical terrain of a cell. 2006 National Land Cover Database contains the 16-class geographical terrain categorization of the United States at a spatial resolution of 30 meters. The categories include developed-open space, developed-high intensity, perennial ice/snow, deciduous forest, open water, etc. Extract the top-3 most common landcover categories in terms of spatial area within 1 km of the representative cell. |
| Elevation | Elevation of a cell is extracted from the National Elevation Dataset (NED) at a spatial resolution of 30 meters. We use average elevation of the representative cell as a feature. |

Core Network (CN) 125 features: For each video streaming session, the computer system 300 can extract CN features for individual flows and the whole session (labeled as Flow and Session features in Table 1A). Since video sessions may have a different number of flows, the computer system 300 computes the following statistical measures to summarize the flow-level features for whole sessions: mean, standard deviation, minimum, maximum, 25th percentile, median (50th percentile), and $75^{th}$ percentile. Hence each flow-level feature listed in Table 1 (labeled with "Summary stats") represents 7 summary values. The computer system 300 also extracted these features for the largest flow (in terms of byte volume) of a video streaming session, as a single flow typically dominates each video session.

Radio Access Network (RAN) 120 features: For each video streaming session, the computer system 300 also extracted RAN features for the user and the cell sectors that service the user during the session. The RAN features are described in Table 1B. For session-level features, the RAN data set records belonging to a user can be identified using the combination of IMSI and session start and end timestamp information. For cell-level features, however, the selection criterion of the representative cell for a session is not obvious because the active set and the primary cell may change between the start and end of a session. Towards this end, the experimenters select the most common cell sector (in terms of number of records) to be the representative cell for a session. For each session, cell-level features are computed for all users served by the representative cell in the time window at the session start.

Features in Table 1 labeled with "Session- and cell-level" indicate features that the computer system 300 computes both a session-level value and cell-level value, as defined above. For example, for # soft handovers, the computer system 300 computes one feature as the number of soft handovers for the user during the session, and another as the number of soft handovers for all users in the representative cell of that session. For features that can hold multiple values during a session (e.g., received signal strength indicator (RSSI)), the computer system 300 computes the same 7 summary statistic values listed above for flow features. These features are labeled with "Summary stats" in Table 1.

To better understand the relationship between features/factors and user engagement, the computer system 300 plots the abandonment rate distributions of prominent features in FIGS. 6A-6O according to embodiments. The abandonment rate is defined as the fraction of sessions in the data set that are abandoned. The shaded areas represent the 95% Wilson score interval. The horizontal line in each plot denotes the average abandonment rate. FIGS. 6A-6O suggests the following implications.

Abandoned sessions are shorter: Although this result is expected, the study finds that each measure of session length provides unique information. FIG. 6F shows sessions shorter than 15 seconds are significantly more likely to be abandoned. The sharp inflection point may be due to automated failure of sessions that do not complete the initial buffering phase. Similarly, FIG. 6L shows a sharp drop in abandonment rate for sessions with average flow duration longer than 1-3 seconds. FIGS. 6C and 6A, both measures of flow count, show that video streaming sessions with more flows are less likely to be abandoned. Thus, each of these features provides information useful for detecting video abandonment with the computer system 300.

Network load increases the abandonment rate: Despite the low bitrate of video streams relative to the capacity of a cell (approximately 500 kbps vs. 3-14 Mbps), computer system 300 finds there is nearly a linear relationship between various measures of RAN load and abandonment rate. For example, FIG. 6D shows that the abandonment rate goes up by roughly 7% for each 10 users with a dedicated channel (DCH) in a sector, even though these resources are scheduled in a proportional fair manner every 2 millisecond (ms). This load relationship can also be seen in FIG. 6K, which shows that the abandonment rate is highest during the peak load hours of the day and much lower during the off-peak hours. This effect can be explained by FIG. 6E, which shows that the abandonment rate begins to grow when aggregate cell uplink throughput is just 50 kbps, significantly less than the cell capacity. This is likely because even small amounts of uplink traffic can cause interference, and FIG. 6G shows that abandonment rate decreases by 2% for each dB increase in the signal-to-interference ratio ($E_c/I_o$). Furthermore, FIG. 6H shows that the abandonment rate increases as RSSI increases, contrary to the general belief that higher received power means a better user experience. These $E_c/I_o$ and RSSI results strongly suggest that users with higher received power also experience more interference (as interference is included in signal strength). Hence, user video engagement in the collected dataset is more limited by interference rather than poor coverage. In summary, these results suggest that measures a cellular operator takes to reduce per-sector (i.e., cell sector) load and interference improves user engagement in a roughly linear manner according to an embodiment.

Handovers increase the abandonment rate: Another important question for wireless network operators is whether cell handovers disrupt the user experience. In the study, results suggest that all handover types are correlated with a decrease in user engagement.

FIG. 6M shows that cells with soft handovers, which are "make-before-break" handovers, have significantly higher abandonment rates. Moreover, FIG. 6O shows that interfrequency handovers, which are "break-before-make" handovers, result in higher abandonment rates. This result is supported by FIG. 6I, which shows increase abandonment rates for non-integral mean active set values (i.e., sessions that incurred active set additions or deletions during soft handovers). These effects may be partially due to the RRC signaling required for handover. FIG. 6N shows that when RRC signaling errors occur, abandonment rate increases sharply as well.

Higher throughput does not always mean lower abandonment: Although measured throughput is often used as a proxy for network quality, our results suggest higher average throughput does not always indicate lower abandonment. FIGS. 6B and 6J show that abandonment rate decreases as average TCP and RLC throughput increases up to a point. However, the abandonment rate is lowest at TCP throughput equal to the steady state streaming rate, and the abandonment rate grows for higher throughput values. This pattern is because early abandonment, while the video (of the video streaming session) is still in the non-rate-limited buffering phase, actually results in higher average throughput than watching a video through the rate-limited steady state phase.

In FIGS. 7A-7F, the computer system 300 plots the skip rate distributions of prominent features according to embodiments. The skip rate is defined as the fraction of sessions in the data set that are skipped. Due to space constraints, the disclosure only plots the skip rate curves for features that have different trends than the respective abandonment rate curves. The shaded areas represent the 95% Wilson score interval. The horizontal line in these plots denotes the average skip rate.

It is noted that skip rate has a direct relationship with maximum flow inter-arrival time (FIG. 7A) and number of flows (FIG. 7B). This is likely because skips result in more flows and larger gaps between them. Skip rate peaks at session and flow durations of just a few seconds (FIGS. 7D and 7E), suggesting that users chose to skip early in a session, either due to network issues or lack of interest. FIG. 7C shows larger reset (RST) flag count correlated with higher skip rate likely because skips cause connection resets. These contrasting patterns imply that it is more challenging to measure both skips and abandonment than a single engagement metric.

3. Modeling User Video Engagement

In this section, the disclosure develops models in the computer system 300 to accurately predict user engagement using only standard radio network statistics and/or TCP/IP header information.

3.1 Overview

Network operators (e.g., utilizing the computer system 300) would like to predict user engagement for three main applications. First, directly estimating these metrics from network traffic requires cost-prohibitive collection of sensitive data beyond TCP/IP headers. Thus, cost and privacy concerns would be alleviated with a model that accurately predicts these engagement metrics using only standard radio and/or TCP/IP header information that is already collected according to embodiments. A simple and efficient model in the computer system 300 is able to monitor video engagement metrics over an entire wireless network 135 in real-time to facilitate trending and alarming applications. Second, self-organizing networks (SON) enable mobile networks to adapt resource allocation dynamically. Thus, the ability to accurately predict video abandonment early in a video session can help guide SONs to provide more resources to the most vulnerable sessions. Third, an interpretable model that relates network factors to user engagement metrics can help wireless network operators (utilizing the computer system 300) determine the combination of factors that need to be adjusted to improve engagement. The computer system 300 is configured to predict the outcome of individual video streaming sessions of each respective user device/equipment 105, and the provide the individual predictions to the cellular network operator to make changes accordingly; for example, the computer system 300 can instruct the cellular network operator of the wireless communication network 135 to increase the signal-to-interference ratio by 2% when the computer system 300 determines/predicts that a particular user of the UE 105 is about to (or likely to) abandon his video streaming session.

One goal is to jointly use the available features to accurately model video abandonment (a measure of user engagement) via the computer system 300. As mentioned in Section 1, the computer system 300 quantified user engagement using nominal (representing (1) completed, non-skipped, (2) abandoned, non-skipped, (3) completed, skipped, and (4) abandoned, skipped) and continuous (representing the fraction of video download completion) variables. The disclosure now develops prediction models for both nominal and continuous user engagement metrics via the computer system 300. Moreover, wireless network operators want to make the prediction decisions as early as possible in a video session. Therefore, the disclosure defines this modeling problem as follows: given the feature set computed over the initial τ seconds (τ≤t) of a video session, predict the user engagement metric (via the computer system 300).

3.2 Model

Predicting user engagement given the available features is non-trivial. As determined in Section 2, many features are not independent of each other and the relationships between features can be non-linear.

To address these challenges, the software application 31 of the computer system 300 uses a machine learning approach for modeling the complex relationships between network features and user engagement metrics. The choice of learning algorithm affects successfully modeling of feature interdependence and non-linearity. After some pilot experiments, the experimenters in the study found that decision tree algorithms with bootstrap aggregation (or bagging) work well for both nominal (classification) and continuous (regression) user engagement metrics, as utilized in the algorithms 32 of the software application 31. Decision trees do not require feature independence assumption and can handle non-linearities by employing multiple splits/breaks for each feature (as shown in FIG. 10). Furthermore, via the computer system 300, decision tree models comprise simple if-then-else branches, which can process data efficiently in real-time and are human interpretable. In the experiments, the software application 31 used the C4.5 decision tree classification algorithm and M5P regression tree algorithm.

Further information regarding the C4.5 decision tree classification algorithm is found in "C4.5: Programs For Machine Learning", by J. R. Quinlan in Morgan Kaufmann, 1993, which is herein incorporated by reference in its entirety. Further information regarding the M5P regression tree algorithm in "Learning With Continuous Classes", by R. J. Quinlan, in 5$^{th}$ Australian Joint Conference on Artificial Intelligence, 1992, which is herein incorporated by reference in its entirety.

3.3 Experimental Setup

The computer system 300 evaluates the effectiveness of classification models in terms of the following standard Receiver Operating Characteristic (ROC) metrics: (1) True Positives (TP), (2) True Negatives (TN), (3) False Positives (FP), and (4) False Negatives (FN).

The experimenters summarize the classification results in terms of the following ROC metrics:

$$\text{True positive rate} = \frac{|TP|}{|TP| + |FN|},$$

$$\text{False positive rate} = \frac{|FP|}{|FP| + |TN|}, \text{ and}$$

$$\text{Accuracy} = \frac{|TP| + |TN|}{|TP| + |TN| + |FP| + |FN|}.$$

The computer system 300 also plotted the standard ROC threshold curves in the evaluation. An ideal ROC threshold curve approaches the top-left corner corresponding to 100% true positive rate and 0% false alarm rate. The Area Under Curve (AUC∈[0, 1]) metric summarizes the classification effectiveness of an ROC threshold curve, where the AUC values approaching 1 indicate better accuracy. Besides, the experimenters evaluated the effectiveness of regression models in terms of the standard root-mean-square error (RMSE∈[0, 1]) metric.

To avoid over-fitting and to ensure that the prediction results generalize, the computer system 300 used stratified k-fold cross-validation procedure. In pilot experiments, different values of k yielded very similar results. All experimental results reported in this disclosure are presented for k=10 but embodiments are not meant to be limited. Furthermore, the computer system 300 evaluated the feature sets on varying initial time window sizes: τ=t, τ≤60 seconds, and τ≤10 seconds. The experimenters expected the classification accuracy to degrade for smaller initial time window size (but the computer system 300 is configured to make predictions for smaller initial time window sizes such as less τ≤7 seconds). Finally, experimenters separately evaluated the core network feature set (abbreviated as CN), the radio network feature set (abbreviated as RAN), the combined feature set (abbreviated as All), and compared them with the following simple features for baseline comparison: (1) Largest Flow Throughput (abbreviated as BL-1) and (2) Session Duration (abbreviated as BL-2). These two baselines (BL-1 and BL-2) represent features that experimenters intuitively believe are correlated with user engagement, as sufficient throughput is required for video streaming and abandonment results in shorter sessions. Results show that jointly modeling all features performs significantly better than these single-feature baselines.

4.4 Results and Discussions

The results demonstrate that the experimenter's model can predict both video abandonment and skips with high accuracy using only the initial 10 seconds of a session via the computer system 300, while meeting the constraints of network operators. Moreover, the decision and regression tree models are interpretable: by following each path in the tree, the experimenters (via computer system 300) can understand the specific set of conditions that impact user video engagement. Some of these conditions can be influenced by a network operator (e.g., cell DCH user count), and thus provide guidance on how to improve user engagement in different situations.

For classification, computer system 300 builds decision tree models to predict both individual classes and their combinations. For individual classes, the experimenters trained the decision tree algorithm (of the software application 31) for 4-way classification. By combining classes, the experimenters change the granularity at which the model predicts user engagement. As mentioned in Section 1, the computer system 300 uses the following two class pairs: (1) completed vs. abandoned; and (2) completed, non-skipped vs. rest. For combined classes, the experimenters train the decision tree algorithm (of the software application 31) for 2-way classification.

Table 2 illustrates the accuracy of 4-way classification for (1) completed, non-skipped, (2) abandoned, non-skipped, (3) completed, skipped, and (4) abandoned, skipped.

TABLE 2

| Feature Set | completed non-skip. (%) | abandoned non-ski. (%) | completed skipped (%) | abandoned skipped (%) | Avg. (%) |
|---|---|---|---|---|---|
| $\tau = t$ | | | | | |
| BL-1 | 60.3 | 48.3 | 57.2 | 48.1 | 53.5 |
| BL-2 | 67.9 | 53.7 | 60.3 | 57.0 | 59.7 |
| CN | 72.0 | 78.4 | 76.2 | 73.4 | 75.0 |
| RAN | 64.1 | 53.7 | 73.2 | 55.7 | 61.7 |
| All | 73.1 | 77.8 | 77.4 | 74.4 | 75.7 |
| $\tau \leq 60$ seconds | | | | | |
| CN | 69.5 | 62.7 | 63.8 | 64.6 | 65.2 |
| RAN | 62.6 | 47.8 | 58.5 | 57.0 | 56.5 |
| All | 70.4 | 63.7 | 65.7 | 65.4 | 66.3 |
| $\tau \leq 10$ seconds | | | | | |
| CN | 69.5 | 59.6 | 63.3 | 65.3 | 64.4 |
| RAN | 60.5 | 46.6 | 59.0 | 57.4 | 55.9 |
| All | 69.6 | 60.7 | 64.9 | 65.5 | 65.2 |

From the 4-way classification results in Table 2, the computer system 300 determined that the core network feature set outperforms the radio network feature set and the baselines. Combining the core and radio network feature sets slightly improves the average accuracy. The computer system 300 determines the best average accuracy of 75.7% for the combined feature set at $\tau=t$ seconds, which represents an improvement of more than 22% and 16% as compared to the two baselines. In practice, this means fewer sessions need to be measured by the computer system 300 before the wireless network operator can be confident that a real change in user video engagement has occurred and an alarm can be raised. For a cell sector, which serves only a handful of users simultaneously, this means a significant reduction in time for the detection of issues (by the computer system 300) since video sessions likely are not frequent. FIGS. 8A, 8B, and 8C illustrate the receiver operating characteristic (ROC) threshold plots for various class pairs according to embodiments. For the combined feature set, the ROC threshold curves are plotted in FIG. 8A. The ordering of ROC curves conforms to the accuracy results in Table 2. The best operating accuracy of 77.8% is observed for abandoned, non-skipped class, which corresponds to 95.5% AUC. As expected, in Table 2 (generated by the computer system 300), the experimenters observed that the average accuracy degrades for smaller values of $\tau$. At $\tau \leq 10$ seconds, the best average accuracy of 65.2% is determined by the computer system 300 for the combined feature set.

Since wireless network operators may only be interested in predicting video abandonment, the computer system 300 also built models to accurately predict (a) completed vs. abandoned and (b) completed, non-skipped vs. rest class pairs (instead of all four classes). These class pairs compare the scenarios when users either abandon or skip the video streaming session.

Table 3 illustrates accuracy of completed vs. abandoned and completed, non-skipped vs. rest classification.

TABLE 3

| Feature Set | comp. (%) | abandoned non-ski. (%) | completed skipped (%) | completed non-skip. (%) | rest (%) | Avg. (%) |
|---|---|---|---|---|---|---|
| $\tau = t$ | | | | | | |
| BL-1 | 62.9 | 61.6 | 62.3 | 59.9 | 78.0 | 73.5 |
| BL-2 | 59.1 | 64.7 | 61.9 | 57.4 | 79.8 | 74.2 |
| CN | 80.5 | 85.9 | 83.2 | 77.2 | 92.3 | 88.5 |
| RAN | 73.9 | 77.9 | 75.9 | 71.9 | 88.8 | 84.5 |
| All | 80.5 | 86.5 | 84.5 | 76.9 | 92.4 | 88.5 |
| $\tau \leq 60$ seconds | | | | | | |
| CN | 79.5 | 82.1 | 80.8 | 78.0 | 91.5 | 88.1 |
| RAN | 74.1 | 78.4 | 76.3 | 72.7 | 88.4 | 84.4 |
| All | 78.8 | 82.6 | 80.7 | 77.6 | 91.4 | 88.0 |
| $\tau \leq 10$ seconds | | | | | | |
| CN | 79.6 | 80.7 | 80.1 | 77.1 | 90.7 | 87.3 |
| RAN | 74.2 | 78.9 | 78.5 | 73.2 | 89.2 | 85.1 |
| All | 77.8 | 82.1 | 79.9 | 76.6 | 90.7 | 87.2 |

Table 3 presents the classification results for these two class pairs. Compared to Table 2, the experimenters observed significant improvement in accuracy for both class pairs. This is expected because the classification algorithms typically have higher accuracy for smaller number of classes. In contrast to the 4-way classification results, the experimenters observed that the average accuracy suffers only minor degradation (up to 5%) as T is reduced. For completed vs. abandoned class pair, the experimenters determined the best average accuracy of 83.5% for the combined feature set at $\tau=t$ seconds, which represents an improvement of more than 21% as compared to the baselines. For the combined feature set, the ROC threshold curve is plotted in FIG. 8B, which corresponds to 93.4% AUC. For completed, non-skipped vs. rest class pair, the experimenters determined (via computer system 300) the best average accuracy of 88.5% for the combined feature set at $\tau=t$ seconds, which represents an improvement of more than 15% and 14% as compared to the baselines. For the combined feature set, the ROC threshold curve is plotted in FIG. 8C, which corresponds to 95.1% AUC.

Table 4 presents the classification results of M5P regression tree algorithm and a simple linear regression algorithm by the computer system 300.

TABLE 4

| Feature Set | Linear Regression | M5P Regression Tree |
|---|---|---|
| $\tau = t$ | | |
| BL-1 | 0.41 | 0.34 |
| BL-2 | 0.38 | 0.32 |
| CN | 0.25 | 0.15 |
| RAN | 0.30 | 0.27 |
| All | 0.23 | 0.14 |
| $\tau \leq 60$ seconds | | |
| CN | 0.27 | 0.18 |
| RAN | 0.36 | 0.34 |
| All | 0.24 | 0.17 |
| $\tau \leq 10$ seconds | | |
| CN | 0.29 | 0.22 |
| RAN | 0.37 | 0.34 |
| All | 0.28 | 0.21 |

In Table 4, the computer system 300 determined that M5P regression tree algorithm consistently outperforms the simple linear regression algorithm, indicating that M5P can successfully capture the non-linear dependencies between features and video download completion that are not modeled by the simple linear regression algorithm. Overall, the experimenters determined (via the computer system 300) similar patterns across feature sets and varying initial window sizes for regression results as determined for classification results earlier. Specifically, RMSE is lower for larger τ values, and All feature set has the lowest RMSE as compared to individual CN and RAN feature sets. The computer system 300 determined the best RMSE of 0.14 for τ=t and All feature set, which represents an improvement of more than 0.20 and 0.18 as compared to the baselines.

The results demonstrate that using all features together results in better classification and regression accuracy than using a subset of features. To systematically analyze the utility of adding features to the classification/regression model, the computer system 300 plotted accuracy as a function of feature set size for completed vs. abandoned classification in graph 900 in FIG. 9. Towards this end, the experimenters via the computer system 300 iteratively ranked the feature set using the following greedy approach: for $k^{th}$ iteration, and evaluated the accuracy gain of the model by separately adding candidate features and selecting the $k+1^{th}$ feature which provides the best accuracy. In FIG. 9, the plot shows that adding features results in diminishing accuracy gains; where top-10% features account for 75% and 80% accuracy without and with bagging, respectively. The top-3 features are related to session size, TCP throughput, and flags. To gain further insight into how these top ranked features influence abandonment rates, the computer system 300 generated the decision and regression tree models.

The pruned version of the decision tree model for completed vs. abandoned class pair and the regression tree model for video download completion are plotted in FIGS. 10A and 10B, respectively. The tuples below the rectangular leaf nodes represent their error and population size. Due to space constraints, the experimenters only plot the tree models for τ≤10 seconds using All feature set. The computer system 300 conducted additional pruning of the trained decision/regression tree models by increasing the minimum number of instances per leaf parameter value in the C4.5/M5P algorithms of the software application 31. These models provide further insights into the characteristics of individual features and interdependence among multiple features. For instance, features at the higher levels of a tree generally have more distinguishing power and account for more population size than lower level features. Consequently, the root node represents the most important feature, which is session duration for FIG. 10A and largest flow volume in FIG. 10B.

The paths from the root node to leaves of the decision/regression tree represent the equivalent rule sets. For instance, for the regression tree in FIG. 10B, if largest flow volume is ≤0.6 MB and largest flow duration is ≤5.3 seconds then video download completion prediction is 17.4% by the computer system 300. In contrast, if largest flow volume is ≤0.6 MB and largest flow duration is >5.3 seconds then video download completion prediction is increased to 49.2% by the computer system 300. Further, for the decision tree in FIG. 10A, if session duration >5.9 seconds and maximum flow volume is ≤90 KB after the first 10 seconds then the model predicts that the video session is abandoned with 19% error probability by the computer system 300. Another beneficial determination (via the computer system 300) is that feature splits generally conform with the observations in Section 2. For example, the decision tree (generated by the computer system 300) predicts a session to be completed when maximum session RSSI is ≤−83.5 dBm and abandoned when maximum session RSSI is >−83.5 dBm. This split represents the pattern demonstrated in FIG. 6H in which abandonment rate increases for larger RSSI values.

FIG. 11 illustrates a method 1100 by the computer system 300 for predicting video engagement from network measurements for a user device (such as one or more user devices 105) connected to the wireless network 135 according to an embodiment.

The computer system 300 is configured to retrieve wireless network measurements from a wireless network device in the wireless communication network 135 at block 1105. The wireless network measurements may include the factors shown in Tables 1A and 1B, along with the data in FIGS. 6A-6O and FIGS. 7A-7F. The computer system 300 may be integrated in and/or connected to the wireless network devices, where the wireless network devices/entities include radio network controllers (RNCs) 112, serving GPRS support nodes (SGSNs) 121, 122, and gateway GPRS support nodes (GGSNs) 123.

At block 1110, the wireless network measurements are related to the user device 105 of a user, where the user device/equipment 105 communicates with the server 131 via the RNC 112, SGSN 121, and GGSN 123.

At block 1115, the computer system 300 is configured to determine that the user device 105 is engaged in a video streaming session based on (only) the wireless network measurements (without using deep packet inspection). For example, the computer system 300 may determine (e.g., in real-time and/or near real-time) that user device 105 is engaged in the video streaming session with the server 131 (which is a video streaming service provider).

At block 1120, the computer system 300 is configured to classify (e.g., in real-time and/or near real-time) the video streaming session as one of a plurality of classes/classifications, where the plurality of classes predict an outcome of the video streaming session for the user device 105 based on (only) the wireless network measurements (without using deep packet inspection).

The plurality of classes comprise completed and non-skipped class, abandoned and skipped class, completed and skipped class, and abandoned and skipped class. For each video streaming sessions of various user devices 105 connected to the wireless communications network 135, the computer system 300 is configured to classify (e.g., in real-time and/or near real-time) the video streaming session as one of the plurality of classes in order to predict the outcome of the video streaming by selecting one of the completed and non-skipped class, the abandoned and skipped class, the completed and skipped class, and/or the abandoned and skipped class (based on one or more of the 31 network factors discussed herein). By the computer system 300 determining/predicting the outcome of the video streaming session in real-time and/or near real-time and providing the prediction (i.e., classification) to the wireless network operator, the wireless network operator can make adjustments to the wireless/cellular communication network 135 to improve the wireless/cellular video streaming session of the user on the user device 105 (which can prevent abandonment).

The wireless network measurements comprise radio network statistics, along with transmission control protocol (TCP) and internet protocol (IP) header information. The wireless network measurements are not retrieved from client-side logs 11 that are at the user device 105, where the client-side logs 11 are not available/privileged to the computer system 300 at all and/or when predicting the outcome. Additionally, the wireless network measurements are not retrieved from server-side logs 12 that are in the server 131 streaming the video streaming session to the user device 105, where the server-side logs 12 are video service provider logs (privileged only to the video service provider, such as Netflix, and not available/privileged to the wireless communication service provider (such as AT&T) of the network communication network 135).

The video streaming session is classified as one of the plurality of classes to predict the outcome of the video streaming session for the user device in an initial predetermined time of the video streaming session. The initial predetermined time for predicting the outcome of the video streaming session is about 10 seconds. The initial predetermined time for predicting the outcome of the video streaming session is less than 10 seconds. The client-side logs 11 and server-side logs 12 are not accessible to the computer system 300 to classify the video streaming session is one of the plurality of classes, and thus the client-side logs 11 and server-side logs 12 cannot be utilized to determine/predict the outcome of the video streaming session within the initial predetermined time.

Note that in one case, a completed video streaming session and/or the prediction of a completed video streaming session (predicted/determined by the computer system 300) for the user device 105 is defined as a predefined percentage completed. In one case, the predefined percentage completed for the video streaming session may be defined as 100% completed. In other cases, the completed video streaming session and/or the prediction of the completed video streaming session (predicted/determined by the computer system 300) is the predefined percentage completed defined as, e.g., ≥99% completed, ≥98% completed, ≥97% completed, ≥95% completed, ≥90% completed, ≥85% completed, etc. The desired predefined percentage completed is predefined in advance, and the prediction of completed is not limited to only being 100% completed as discussed above. As such, when the computer system 300 predicts/determines that the video streaming session for the user device 105 is going to be completed, the prediction of completed may be based on the predefined percentage completion for the video streaming session (such as, e.g., predicting that the video streaming session is going to be ≥90% completed) as discussed above. Note that the prediction of completed video streaming session includes the classification for completed, non-skipped video streaming session and completed, skipped video streaming session. Therefore, when one of the plurality of classes predicts (via computer system 300) that the outcome of the video streaming session for the user device is a classification of completed (in any fashion), the classification of completed relates to a predefined percentage completed for the video streaming session.

FIG. 12 illustrates an example of the computer 1200 having capabilities, which may be included in exemplary embodiments. Various methods, procedures, circuits, elements, and techniques discussed herein may incorporate and/or utilize the capabilities of the computer 1200. One or more of the capabilities of the computer 500 may be utilized to implement, to incorporate, to connect to, and/or to support any element discussed herein (as understood by one skilled in the art) in FIGS. 1-11. For example, the elements 105, 112, 121, 122, 123, 131, 132, 133, 135, 300 may incorporate any of the hardware and software features discussed in FIG. 12.

Generally, in terms of hardware architecture, the computer 1200 may include one or more processors 1210, computer readable storage memory 1220, and one or more input and/or output (I/O) devices 1270 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1210 is a hardware device for executing software that can be stored in the memory 1220. The processor 1210 can be virtually any custom made or commercially available processor, a central processing unit (CPU), a data signal processor (DSP), or an auxiliary processor among several processors associated with the computer 1200, and the processor 1210 may be a semiconductor based microprocessor (in the form of a microchip) or a microprocessor.

The computer readable memory 1220 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1220 may incorporate electronic, magnetic, optical, and/or other types of storage media. Note that the memory 1220 can have a distributed architecture, where various components are situated remote from one another, but can be accessed by the processor 1210.

The software in the computer readable memory 1220 may include one or more separate programs, each of which comprises an ordered listing of executable instructions for implementing logical functions. The software in the memory 1220 includes a suitable operating system (O/S) 1250, compiler 1240, source code 1230, and one or more applications 1260 of the exemplary embodiments. As illustrated, the application 1260 comprises numerous functional components for implementing the features, processes, methods, functions, and operations of the exemplary embodiments. The application 1260 of the computer 1200 may represent numerous applications, agents, software components, modules, interfaces, controllers, etc., as discussed herein but the application 1260 is not meant to be a limitation.

The operating system 1250 may control the execution of other computer programs, and provides scheduling, input-output control, file and data management, memory management, and communication control and related services.

The application 1260 may be a source program, executable program (object code), script, or any other entity comprising a set of instructions to be performed. When a source program, then the program is usually translated via a compiler (such as the compiler 1240), assembler, interpreter, or the like, which may or may not be included within the memory 1220, so as to operate properly in connection with the O/S 1250. Furthermore, the application 1260 can be written as (a) an object oriented programming language, which has classes of data and methods, or (b) a procedure programming language, which has routines, subroutines, and/or functions.

The I/O devices 1270 may include input devices (or peripherals) such as, for example but not limited to, a mouse, keyboard, scanner, microphone, camera, etc. Furthermore, the I/O devices 1270 may also include output devices (or peripherals), for example but not limited to, a printer, display, etc. Finally, the I/O devices 1270 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1270 also include components for communicating over various networks, such as the Internet or an intranet. The I/O devices 1270 may be connected to and/or communicate with the processor 1210 utilizing Bluetooth connections and cables (via, e.g., Universal Serial Bus (USB) ports, serial ports, parallel ports, FireWire, HDMI (High-Definition Multimedia Interface), etc.).

When the computer 1200 is in operation, the processor 1210 is configured to execute software stored within the memory 1220, to communicate data to and from the memory 1220, and to generally control operations of the computer 1200 pursuant to the software. The application 1260 and the O/S 1250 are read, in whole or in part, by the processor 1210, perhaps buffered within the processor 1210, and then executed.

When the application 1260 is implemented in software, it should be noted that the application 1260 can be stored on virtually any computer readable storage medium for use by or in connection with any computer related system or method. The application 1260 can be embodied in any computer-readable medium for use by or in connection with an instruction execution system, apparatus, server, or device, such as a computer-based system, processor-containing system, or other system that can fetch the instructions from the instruction execution system, apparatus, or device and execute the instructions.

In exemplary embodiments, where the application 1260 is implemented in hardware, the application 1260 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of processor-implemented processes and devices for practicing those processes, such as processor. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for predicting video engagement from network measurements for a user device connected to a wireless network, the method comprising:
    retrieving wireless network measurements from a wireless network device in a radio access network of the wireless network, the wireless network measurements having been collected at the radio access network; and
    wherein the wireless network measurements are related to the user device of a user;
    determining that the user device is presently engaged in a video streaming session on the wireless network;
    in response to the user device being engaged in the video streaming session on the wireless network, predicting, by a computer, an outcome from a selection of likely to abandon and likely to complete for the video streaming session presently engaged in for the user device in an initial 10 seconds of the video streaming session, the outcome from the selection of likely to abandon and likely to complete being predicted for and during the video streaming session itself which the user device is presently engaged;
    wherein predicting the outcome for and during the video streaming session itself from the selection of likely to abandon and likely to complete is based on one or more of the following: signal strength information, received signal code power, and admission control failures;
    wherein adjustments are made to the wireless network in response to predicting the outcome of the video streaming session for the user device.

2. The method of claim 1, further comprising, in order to predict the outcome of the video streaming session, classifying, by the computer, the video streaming session during the initial 10 seconds on the wireless network as one of a plurality of classes comprising a completed and non-skipped class, an abandoned and non-skipped class, a completed and skipped class, and an abandoned and skipped class;
    wherein classifying the video streaming session during the initial 10 seconds as one of the plurality of classes in order to predict the outcome of the video streaming session comprises selecting one of the completed and non-skipped class, the abandoned and non-skipped class, the completed and skipped class, and the abandoned and skipped class.

3. The method of claim 2, wherein the wireless network measurements comprise radio network statistics, along with transmission control protocol and internet protocol header information.

4. The method of claim 3, wherein the wireless network measurements are not retrieved from client-side logs that are at the user device; and
wherein the wireless network measurements are not retrieved from server-side logs that are at a server streaming the video streaming session to the user device, the server-side logs are video service provider logs.

5. The method of claim 2, wherein when one of the plurality of classes predicts that the outcome of the video streaming session for the user device is a classification of completed, the classification of completed relates to a percentage completed for the video streaming session.

6. An apparatus comprising:
a processor; and
memory comprising computer-executable instructions that, when executed by the processor, cause the processor to perform operations for predicting video engagement from network measurements for a user device connected to a wireless network, the operations comprising:
retrieving wireless network measurements from a wireless network device in a radio access network of the wireless network, the wireless network measurements having been collected at the radio access network;
wherein the wireless network measurements are related to the user device of a user;
determining that the user device is presently engaged in a video streaming session on the wireless network;
in response to the user device being engaged in the video streaming session on the wireless network, predicting an outcome from a selection of likely to abandon and likely to complete for the video streaming session presently engaged in for the user device in an initial 10 seconds of the video streaming session, the outcome from the selection of likely to abandon and likely to complete being predicted for and during the video streaming session itself which the user device is presently engaged;
wherein predicting the outcome for and during the video streaming session itself from the selection of likely to abandon and likely to complete is based on one or more of the following: signal strength information, received signal code power, and admission control failures;
wherein adjustments are made to the wireless network in response to predicting the outcome of the video streaming session for the user device.

7. The apparatus of claim 6, further comprising, in order to predict the outcome of the video streaming session, classifying, by the computer, the video streaming session on the wireless network as one of a plurality of classes comprising a completed and non-skipped class, an abandoned and non-skipped class, a completed and skipped class, and an abandoned and skipped class;
wherein classifying the video streaming session as one of the plurality of classes in order to predict the outcome of the video streaming session comprises selecting one of the completed and non-skipped class, the abandoned and non-skipped class, the completed and skipped class, and the abandoned and skipped class.

8. The apparatus of claim 7, wherein the wireless network measurements comprise radio network statistics, along with transmission control protocol and internet protocol header information.

9. The apparatus of claim 8, wherein the wireless network measurements are not retrieved from client-side logs that are at the user device; and
wherein the wireless network measurements are not retrieved from server-side logs that are at a server streaming the video streaming session to the user device, the server-side logs are video service provider logs.

10. A computer program product, tangibly embodied on a non-transitory computer readable medium, for predicting video engagement from network measurements for a user device connected to a wireless network, the computer program product including instructions that, when executed by a processor, cause the processor to perform operations comprising:
retrieving wireless network measurements from a wireless network device in a radio access network of the wireless network, the wireless network measurements having been collected at the radio access network; and
wherein the wireless network measurements are related to the user device of a user;
determining that the user device is presently engaged in a video streaming session on the wireless network;
in response to the user device being engaged in the video streaming session on the wireless network, predicting an outcome from a selection of likely to abandon and likely to complete for the video streaming session presently engaged in for the user device in an initial 10 seconds of the video streaming session, the outcome from the selection of likely to abandon and likely to complete being predicted for and during the video streaming session itself which the user device is presently engaged;
wherein predicting the outcome for and during the video streaming session itself from the selection of likely to abandon and likely to complete is based on one or more of the following: signal strength information, received signal code power, and admission control failures;
wherein adjustments are made to the wireless network in response to predicting the outcome of the video streaming session for the user device.

11. The computer program product of claim 10, further comprising, in order to predict the outcome of the video streaming session, classifying, by the computer, the video streaming session on the wireless network as one of a plurality of classes comprising a completed and non-skipped class, an abandoned and non-skipped class, a completed and skipped class, and an abandoned and skipped class;
wherein classifying the video streaming session as one of the plurality of classes in order to predict the outcome of the video streaming comprises selecting one of the completed and non-skipped class, the abandoned and non-skipped class, the completed and skipped class, and the abandoned and skipped class.

12. The method of claim 1, wherein the computer is in the radio access network.

13. The method of claim 1, wherein, in response to the outcome being predicted, the adjustments are made to the wireless network to avoid abandonment of the video streaming session by the user device.

14. The method of claim 1, wherein the outcome from the selection of likely to abandon and likely to complete is predicted in real-time while the video streaming session is being streamed.

15. The method of claim 1, wherein the outcome, predicted for the video streaming session presently engaged in for the user device in the initial 10 seconds, of the video streaming session is to predict whether the user completely downloads a video with at least 87% accuracy.

* * * * *